United States Patent
Hunt et al.

(10) Patent No.: US 9,104,779 B2
(45) Date of Patent: Aug. 11, 2015

(54) SYSTEMS AND METHODS FOR ANALYZING AND SYNTHESIZING COMPLEX KNOWLEDGE REPRESENTATIONS

(75) Inventors: Anne Jude Hunt, Palo Alto, CA (US); Alexander David Black, Guelph (CA); Peter Joseph Sweeney, Kitchener (CA); Ihab Francis Ilyas, Waterloo (CA)

(73) Assignee: Primal Fusion Inc., Kitchener (CA)

( * ) Notice: Subject to any disclaimer, the term of this patent is extended or adjusted under 35 U.S.C. 154(b) by 787 days.

(21) Appl. No.: 13/165,423

(22) Filed: Jun. 21, 2011

(65) Prior Publication Data

US 2011/0320396 A1  Dec. 29, 2011

Related U.S. Application Data

(63) Continuation-in-part of application No. 12/477,977, filed on Jun. 4, 2009, now Pat. No. 8,010,570, which is a continuation of application No. 11/625,452, filed on Jan. 22, 2007, now Pat. No. 7,849,090, which is a (Continued)

(51) Int. Cl.
*G06F 17/30* (2006.01)
*G06N 5/02* (2006.01)

(52) U.S. Cl.
CPC ............ *G06F 17/30914* (2013.01); *G06N 5/02* (2013.01)

(58) Field of Classification Search
CPC .................... G06F 17/30914; G06F 17/30684; G06F 17/30731
USPC .............. 707/791, 794, 796, 827; 706/46, 47
See application file for complete search history.

(56) References Cited

U.S. PATENT DOCUMENTS 3,943,462 A   3/1976  Thompson
4,532,813 A   8/1985  Rinehart
(Continued)

FOREIGN PATENT DOCUMENTS

CA   2734756 A1   3/2010
CN   1395193 A    5/2003
(Continued)

OTHER PUBLICATIONS

Haralampos Karanikas et al., MetaOn—Ontology Driven Metadata Construction and Management for Intelligent Search in Text and Image Collections, 2006, IEEE, 5 pages.*

(Continued)

*Primary Examiner* — Jean B Fleurantin
(74) *Attorney, Agent, or Firm* — Wolf, Greenfield & Sacks, P.C.

(57) ABSTRACT

Techniques for analyzing and synthesizing complex knowledge representations (KRs) may utilize an atomic knowledge representation model including both an elemental data structure and knowledge processing rules stored as machine-readable data and/or programming instructions. One or more of the knowledge processing rules may be applied to analyze an input complex KR to deconstruct its complex concepts and/or concept relationships to elemental concepts and/or concept relationships to be included in the elemental data structure. One or more of the knowledge processing rules may be applied to synthesize an output complex KR from the stored elemental data structure in accordance with an input context. Multiple input complex KRs of various types may be analyzed and deconstructed to populate the elemental data structure, and input complex KRs may be transformed through the elemental data structure to output complex KRs of different types, providing semantic interoperability to KRs of different types and/or KR models.

18 Claims, 12 Drawing Sheets

Related U.S. Application Data continuation-in-part of application No. 11/550,457, filed on Oct. 18, 2006, now Pat. No. 7,606,781, which is a continuation-in-part of application No. 11/469,258, filed on Aug. 31, 2006, now Pat. No. 7,596,574, which is a continuation-in-part of application No. 11/392,937, filed on Mar. 30, 2006, now abandoned.

(60) Provisional application No. 60/666,166, filed on Mar. 30, 2005, provisional application No. 61/357,266, filed on Jun. 22, 2010.

(56) References Cited

U.S. PATENT DOCUMENTS

| | | |
|---|---|---|
| 4,972,328 A | 11/1990 | Wu et al. |
| 5,056,021 A | 10/1991 | Ausborn |
| 5,193,185 A | 3/1993 | Lanter |
| 5,369,763 A | 11/1994 | Biles |
| 5,594,837 A * | 1/1997 | Noyes .............. 706/55 |
| 5,745,910 A | 4/1998 | Piersol et al. |
| 5,793,376 A | 8/1998 | Tanaka et al. |
| 5,835,758 A | 11/1998 | Nochur et al. |
| 5,911,145 A | 6/1999 | Arora et al. |
| 5,924,098 A | 7/1999 | Kluge |
| 5,937,400 A | 8/1999 | Au |
| 5,950,173 A | 9/1999 | Perkowski |
| 5,953,726 A | 9/1999 | Carter et al. |
| 6,006,222 A | 12/1999 | Culliss |
| 6,078,916 A | 6/2000 | Culliss |
| 6,098,033 A | 8/2000 | Richardson et al. |
| 6,138,085 A | 10/2000 | Richardson et al. |
| 6,167,390 A | 12/2000 | Brady et al. |
| 6,173,276 B1 | 1/2001 | Kant et al. |
| 6,233,575 B1 | 5/2001 | Agrawal et al. |
| 6,292,792 B1 * | 9/2001 | Baffes et al. ............... 706/45 |
| 6,295,066 B1 | 9/2001 | Tanizaki et al. |
| 6,334,131 B2 | 12/2001 | Chakrabarti et al. |
| 6,349,275 B1 | 2/2002 | Schumacher et al. |
| 6,356,899 B1 | 3/2002 | Chakrabarti et al. |
| 6,396,864 B1 | 5/2002 | O'Brien et al. |
| 6,401,061 B1 | 6/2002 | Zieman |
| 6,487,547 B1 | 11/2002 | Ellison et al. |
| 6,499,024 B1 | 12/2002 | Stier et al. |
| 6,539,376 B1 | 3/2003 | Sundaresan et al. |
| 6,539,395 B1 | 3/2003 | Gjerdingen et al. |
| 6,556,983 B1 | 4/2003 | Altschuler et al. |
| 6,571,240 B1 | 5/2003 | Ho et al. |
| 6,694,329 B2 | 2/2004 | Murray |
| 6,751,611 B2 | 6/2004 | Krupin et al. |
| 6,751,621 B1 | 6/2004 | Calistri-Yeh et al. |
| 6,768,982 B1 | 7/2004 | Collins et al. |
| 6,772,136 B2 | 8/2004 | Kant et al. |
| 6,785,683 B1 | 8/2004 | Zodik et al. |
| 6,868,525 B1 | 3/2005 | Szabo |
| 6,976,020 B2 | 12/2005 | Anthony et al. |
| 6,980,984 B1 | 12/2005 | Huffman et al. |
| 7,007,074 B2 | 2/2006 | Radwin |
| 7,010,144 B1 | 3/2006 | Davis et al. |
| 7,035,864 B1 | 4/2006 | Ferrari et al. |
| 7,051,023 B2 | 5/2006 | Kapur et al. |
| 7,062,466 B2 | 6/2006 | Wagner et al. |
| 7,062,483 B2 | 6/2006 | Ferrari et al. |
| 7,089,237 B2 | 8/2006 | Turnbull et al. |
| 7,120,646 B2 | 10/2006 | Streepy, Jr. |
| 7,152,065 B2 | 12/2006 | Behrens et al. |
| 7,181,465 B2 | 2/2007 | Maze et al. |
| 7,209,922 B2 | 4/2007 | Maze et al. |
| 7,225,183 B2 | 5/2007 | Gardner |
| 7,249,117 B2 | 7/2007 | Estes |
| 7,280,991 B1 | 10/2007 | Beams et al. |
| 7,283,992 B2 | 10/2007 | Liu et al. |
| 7,302,418 B2 | 11/2007 | Asahara |
| 7,319,951 B2 | 1/2008 | Rising, III et al. |
| 7,392,250 B1 | 6/2008 | Dash et al. |
| 7,406,456 B2 | 7/2008 | Calistri-Yeh et al. |
| 7,418,452 B2 | 8/2008 | Maze |
| 7,440,940 B2 | 10/2008 | Chen et al. |
| 7,478,089 B2 | 1/2009 | Henkin et al. |
| 7,490,073 B1 | 2/2009 | Qureshi et al. |
| 7,493,319 B1 | 2/2009 | Dash et al. |
| 7,496,593 B2 | 2/2009 | Gardner et al. |
| 7,502,810 B2 | 3/2009 | Acevedo-Aviles et al. |
| 7,523,102 B2 * | 4/2009 | Bjarnestam et al. ............. 1/1 |
| 7,580,918 B2 | 8/2009 | Chang et al. |
| 7,584,208 B2 * | 9/2009 | Spivack et al. ............. 1/1 |
| 7,596,374 B2 | 9/2009 | Katou |
| 7,596,574 B2 | 9/2009 | Sweeney |
| 7,606,168 B2 | 10/2009 | Robinson et al. |
| 7,606,781 B2 | 10/2009 | Sweeney et al. |
| 7,627,582 B1 | 12/2009 | Ershov |
| 7,668,737 B2 | 2/2010 | Streepy, Jr. |
| 7,711,672 B2 | 5/2010 | Au |
| 7,716,207 B2 | 5/2010 | Odom et al. |
| 7,716,216 B1 | 5/2010 | Harik et al. |
| 7,720,857 B2 | 5/2010 | Beringer et al. |
| 7,752,199 B2 | 7/2010 | Farrell |
| 7,752,534 B2 | 7/2010 | Blanchard, III et al. |
| 7,827,125 B1 | 11/2010 | Rennison |
| 7,844,565 B2 | 11/2010 | Sweeney |
| 7,849,090 B2 | 12/2010 | Sweeney |
| 7,860,817 B2 | 12/2010 | Sweeney et al. |
| 7,908,240 B1 | 3/2011 | Mazzagatti et al. |
| 7,917,534 B2 | 3/2011 | Demiroski et al. |
| 7,945,555 B2 | 5/2011 | Sankaran et al. |
| 7,970,764 B1 | 6/2011 | Ershov |
| 8,010,570 B2 | 8/2011 | Sweeney |
| 8,281,238 B2 | 10/2012 | Sweeney et al. |
| 8,385,971 B2 | 2/2013 | Rhoads et al. |
| 8,849,860 B2 | 9/2014 | Ilyas et al. |
| 2002/0069197 A1 | 6/2002 | Katayama et al. |
| 2002/0078044 A1 | 6/2002 | Song et al. |
| 2002/0133483 A1 | 9/2002 | Klenk et al. |
| 2002/0194187 A1 | 12/2002 | McNeil et al. |
| 2003/0177112 A1 | 9/2003 | Gardner |
| 2003/0196094 A1 | 10/2003 | Hillis et al. |
| 2003/0217023 A1 | 11/2003 | Cui et al. |
| 2003/0217335 A1 | 11/2003 | Chung et al. |
| 2004/0024739 A1 | 2/2004 | Copperman et al. |
| 2004/0049522 A1 | 3/2004 | Streepy, Jr. |
| 2004/0243395 A1 | 12/2004 | Gluzberg et al. |
| 2005/0010428 A1 | 1/2005 | Bergeron et al. |
| 2005/0065955 A1 | 3/2005 | Babikov et al. |
| 2005/0086188 A1 | 4/2005 | Hillis et al. |
| 2005/0131924 A1 | 6/2005 | Jones |
| 2005/0149518 A1 | 7/2005 | Duan et al. |
| 2005/0154708 A1 | 7/2005 | Sun |
| 2005/0159921 A1 | 7/2005 | Louviere et al. |
| 2005/0209874 A1 | 9/2005 | Rossini |
| 2005/0216320 A1 | 9/2005 | Hattaway |
| 2005/0216335 A1 | 9/2005 | Fikes et al. |
| 2005/0223109 A1 | 10/2005 | Mamou et al. |
| 2005/0256907 A1 | 11/2005 | Novik et al. |
| 2005/0278362 A1 | 12/2005 | Maren et al. |
| 2005/0289524 A1 | 12/2005 | McGinnes |
| 2006/0010117 A1 | 1/2006 | Bonabeau et al. |
| 2006/0026147 A1 | 2/2006 | Cone et al. |
| 2006/0053172 A1 | 3/2006 | Gardner et al. |
| 2006/0074980 A1 | 4/2006 | Sarkar |
| 2006/0085489 A1 | 4/2006 | Tomic et al. |
| 2006/0129906 A1 | 6/2006 | Wall |
| 2006/0153083 A1 | 7/2006 | Wallenius |
| 2006/0195407 A1 | 8/2006 | Athelogou et al. |
| 2006/0242564 A1 | 10/2006 | Egger et al. |
| 2006/0271520 A1 | 11/2006 | Ragan |
| 2007/0010994 A1 | 1/2007 | Mueller |
| 2007/0033531 A1 | 2/2007 | Marsh |
| 2007/0036440 A1 | 2/2007 | Schaepe et al. |
| 2007/0038500 A1 | 2/2007 | Hammitt et al. |
| 2007/0061195 A1 | 3/2007 | Liu et al. |
| 2007/0078889 A1 | 4/2007 | Hoskinson |
| 2007/0083492 A1 | 4/2007 | Hohimer et al. |
| 2007/0094221 A1 | 4/2007 | Au |
| 2007/0106658 A1 | 5/2007 | Ferrari et al. |

(56) References Cited

U.S. PATENT DOCUMENTS

| | | |
|---|---|---|
| 2007/0118394 A1 | 5/2007 | Cahoon |
| 2007/0118542 A1 | 5/2007 | Sweeney |
| 2007/0136221 A1 | 6/2007 | Sweeney et al. |
| 2007/0143300 A1 | 6/2007 | Gulli et al. |
| 2007/0174041 A1 | 7/2007 | Yeske |
| 2007/0192272 A1 | 8/2007 | Elfayoumy et al. |
| 2007/0203865 A1 | 8/2007 | Hirsch |
| 2007/0208719 A1 | 9/2007 | Tran |
| 2007/0208764 A1 | 9/2007 | Grisinger |
| 2007/0239892 A1 | 10/2007 | Ott et al. |
| 2007/0255731 A1 | 11/2007 | Maze |
| 2007/0282824 A1 | 12/2007 | Ellingsworth |
| 2007/0288503 A1 | 12/2007 | Taylor |
| 2007/0294200 A1 | 12/2007 | Au |
| 2007/0300142 A1 | 12/2007 | King et al. |
| 2008/0001948 A1 | 1/2008 | Hirsch |
| 2008/0004844 A1 | 1/2008 | Kefford et al. |
| 2008/0004864 A1 | 1/2008 | Gabrilovich et al. |
| 2008/0021925 A1 | 1/2008 | Sweeney |
| 2008/0028084 A1 | 1/2008 | Bloching et al. |
| 2008/0036617 A1 | 2/2008 | Arms et al. |
| 2008/0059125 A1 | 3/2008 | Fraser et al. |
| 2008/0072145 A1 | 3/2008 | Blanchard et al. |
| 2008/0086465 A1 | 4/2008 | Fontenot et al. |
| 2008/0092044 A1 | 4/2008 | Lewis et al. |
| 2008/0126303 A1 | 5/2008 | Park et al. |
| 2008/0137668 A1 | 6/2008 | Rodriguez et al. |
| 2008/0154906 A1 | 6/2008 | McDavid et al. |
| 2008/0162498 A1 | 7/2008 | Omoigui |
| 2008/0228568 A1 | 9/2008 | Williams et al. |
| 2008/0243480 A1 | 10/2008 | Bartz et al. |
| 2008/0270120 A1 | 10/2008 | Pestian et al. |
| 2008/0275694 A1 | 11/2008 | Varone |
| 2008/0281814 A1 | 11/2008 | Calistri-Yeh et al. |
| 2008/0294584 A1 | 11/2008 | Herz |
| 2008/0294641 A1 | 11/2008 | Kim |
| 2009/0012842 A1 | 1/2009 | Srinivasan et al. |
| 2009/0018988 A1 | 1/2009 | Abrams et al. |
| 2009/0024385 A1 | 1/2009 | Hirsch |
| 2009/0024556 A1 | 1/2009 | Hirsch |
| 2009/0028164 A1 | 1/2009 | Hirsch |
| 2009/0055342 A1 | 2/2009 | Gong et al. |
| 2009/0070219 A1 | 3/2009 | D'Angelo et al. |
| 2009/0083140 A1 | 3/2009 | Phan |
| 2009/0106234 A1 | 4/2009 | Siedlecki et al. |
| 2009/0138454 A1 | 5/2009 | Rayner et al. |
| 2009/0144059 A1 | 6/2009 | Yu et al. |
| 2009/0150809 A1 | 6/2009 | Hirsch |
| 2009/0157442 A1 | 6/2009 | Tesler |
| 2009/0157616 A1 | 6/2009 | Barber et al. |
| 2009/0182725 A1 | 7/2009 | Govani et al. |
| 2009/0192954 A1 | 7/2009 | Katukuri et al. |
| 2009/0192968 A1 | 7/2009 | Tunstall-Pedoe |
| 2009/0198561 A1 | 8/2009 | Otto et al. |
| 2009/0228425 A1 | 9/2009 | Goraya |
| 2009/0300326 A1 | 12/2009 | Sweeney |
| 2009/0307581 A1 | 12/2009 | Jaepel et al. |
| 2009/0319508 A1 | 12/2009 | Yih et al. |
| 2009/0327205 A1 | 12/2009 | Sweeney |
| 2009/0327417 A1 | 12/2009 | Chakra et al. |
| 2010/0030552 A1 | 2/2010 | Chen et al. |
| 2010/0036783 A1 | 2/2010 | Rodriguez |
| 2010/0036790 A1 | 2/2010 | Sweeney et al. |
| 2010/0036829 A1 | 2/2010 | Leyba |
| 2010/0049702 A1 | 2/2010 | Martinez et al. |
| 2010/0049766 A1 | 2/2010 | Sweeney et al. |
| 2010/0057664 A1 | 3/2010 | Sweeney et al. |
| 2010/0070448 A1 | 3/2010 | Omoigui |
| 2010/0100546 A1 | 4/2010 | Kohler |
| 2010/0107094 A1 | 4/2010 | Steelberg et al. |
| 2010/0122151 A1 | 5/2010 | Mendelson et al. |
| 2010/0153219 A1 | 6/2010 | Mei et al. |
| 2010/0161317 A1 | 6/2010 | Au |
| 2010/0198724 A1 | 8/2010 | Thomas |
| 2010/0205061 A1 | 8/2010 | Karmarkar |
| 2010/0217745 A1 | 8/2010 | Song et al. |
| 2010/0223295 A1 | 9/2010 | Stanley et al. |
| 2010/0228693 A1 | 9/2010 | Dawson et al. |
| 2010/0235285 A1 | 9/2010 | Hoffberg |
| 2010/0235307 A1 | 9/2010 | Sweeney et al. |
| 2010/0250526 A1 | 9/2010 | Prochazka et al. |
| 2010/0257171 A1 | 10/2010 | Shekhawat |
| 2010/0262456 A1 | 10/2010 | Feng et al. |
| 2010/0268596 A1 | 10/2010 | Wissner et al. |
| 2010/0280860 A1 | 11/2010 | Iskold et al. |
| 2010/0285818 A1 | 11/2010 | Crawford |
| 2010/0287011 A1 | 11/2010 | Muchkaev |
| 2010/0317420 A1 | 12/2010 | Hoffberg |
| 2011/0040749 A1 | 2/2011 | Ceri et al. |
| 2011/0060644 A1 | 3/2011 | Sweeney |
| 2011/0060645 A1 | 3/2011 | Sweeney |
| 2011/0060794 A1 | 3/2011 | Sweeney |
| 2011/0113386 A1 | 5/2011 | Sweeney et al. |
| 2011/0173176 A1 | 7/2011 | Christensen et al. |
| 2011/0271270 A1 | 11/2011 | Bowen |
| 2011/0282919 A1 | 11/2011 | Sweeney et al. |
| 2011/0314006 A1 | 12/2011 | Sweeney et al. |
| 2011/0314382 A1 | 12/2011 | Sweeney |
| 2011/0320396 A1 | 12/2011 | Hunt et al. |
| 2012/0143880 A1 | 6/2012 | Sweeney et al. |
| 2012/0150874 A1 | 6/2012 | Sweeney et al. |
| 2012/0166371 A1 | 6/2012 | Sweeney et al. |
| 2012/0166372 A1 | 6/2012 | Ilyas et al. |
| 2012/0166373 A1 | 6/2012 | Sweeney et al. |
| 2013/0046723 A1 | 2/2013 | Sweeney et al. |
| 2013/0066823 A1 | 3/2013 | Sweeney et al. |
| 2013/0246328 A1 | 9/2013 | Sweeney et al. |

FOREIGN PATENT DOCUMENTS

| | | |
|---|---|---|
| EP | 0 962 873 A1 | 12/1999 |
| WO | WO 02/054292 A2 | 7/2002 |
| WO | WO02054292 | 7/2002 |
| WO | WO 2004/075466 A2 | 9/2004 |
| WO | WO 2005/020093 A1 | 3/2005 |
| WO | WO 2005/020094 A1 | 3/2005 |
| WO | WO 2007/047971 A2 | 4/2007 |
| WO | WO 2008/025167 A1 | 3/2008 |
| WO | WO 2008/076438 A1 | 6/2008 |
| WO | WO 2009/014837 A2 | 1/2009 |
| WO | WO 2009/132442 A1 | 11/2009 |
| WO | WO 2010/022505 A1 | 3/2010 |
| WO | WO 2010/149427 A1 | 12/2010 |
| WO | WO 2011/029177 A1 | 3/2011 |
| WO | WO 2011/029177 A4 | 3/2011 |
| WO | WO 2011/057396 A1 | 5/2011 |
| WO | WO 2011/160204 A1 | 12/2011 |
| WO | WO 2011/160205 A1 | 12/2011 |
| WO | WO 2011/160214 A1 | 12/2011 |
| WO | WO 2012/088590 A1 | 7/2012 |
| WO | WO 2012/088591 A1 | 7/2012 |
| WO | WO 2012/088611 A1 | 7/2012 |
| WO | WO 2012/092669 A1 | 7/2012 |

OTHER PUBLICATIONS

Mar. 30, 2009 Office Action in U.S. Appl. No. 11/625,452.
Dec. 7, 2009 Office Action in U.S. Appl. No. 11/625,452.
Mar. 26, 2010 Office Action in U.S. Appl. No. 11/625,452.
Aug. 31, 2010 Office Action in U.S. Appl. No. 12/477,994.
Sep. 28, 2010 Office Action in U.S. Appl. No. 12/477,977.
Aug. 21, 2008 Office Action in U.S. Appl. No. 11/469,258.
Dec. 15, 2008 Office Action U.S. Appl. No. 11/550,457.
Jun. 29, 2010 Office Action in U.S. Appl. No. 12/556,349.
International Preliminary Report on Patentability for International Application No. PCT/CA2011/000745 mailed Jan. 10, 2013.
Office Action for U.S. Appl. No. 13/345,640 mailed May 10, 2013.
International Preliminary Report on Patentability for PCT/CA2012/000009, mailed Jul. 18, 2013.
Office Action for U.S. Appl. No. 13/345,637 mailed Aug. 2, 2013.
Brewster, C.; Ciravengna, F.; and Wilks, Y.; (2002). User-Centered Ontology Learning for Knowledge Management. 7th International

(56) References Cited

OTHER PUBLICATIONS

Workshop on Applications of Natural Language to Information Systems, Stockholm, Jun. 27-28, 2002, Lecture Notes in Computer Sciences, Springer Verlag. pp. 203-207. 5 pages.
Rocha, L. M. (2001). Adaptive Webs for Heterarchies with Diverse Communities of Users. Paper prepared for the workshop from Intelligent Networks to the Global Brain: Evolutionary Social Organization through Knowledge Technology, Brussels, Jul. 3-5, 2001. LAUR005173. pp. 1-35. 35 pages.
Slavic, A; Cordeiro, M.I. (2004). Core Requirements for Automation of Analytico-Synthetic Classifications. Advances in Knowledge Organization. 2004, vol. 9, pp. 187-192. 6 pages. (The year of publication is sufficiently earlier than the effective U.S. filing data and only priority date so that the particular month of publication is not in issue. See MPEP 609.04(a)).
Zhang, G.Q.; Troy, A.D.; and Bourgoin, K. (2006). Bootstrapping Ontology Learning for Information Retrieval Using Formal Concept Analysis and Information Anchors. 14th International Conference on Conceptual Structures. Aalborg, Denmark. Jul. 2006. pp. 1-14. 14 pages.
"Faceted Classification and Adaptive Concept Matching," Gemstone Business Intelligence Ltd., Feb. 2006. pp. 1-7. 7 pages.
International Search Report dated Dec. 28, 2007 of International Application No. PCT/CA2007/001546. 6 pages.
Interview Summary in U.S. Appl. No. 11/469,258, Dec. 16, 2008; Examiner Woo. 3 pages.
U.S. Office Action in U.S. Appl. No. 11/469,258, Aug. 21, 2008; Examiner Woo. 20 pages.
Anick, P.; and Tipirneni, S. (1999). Interactive document retrieval using faceted terminological feedback. HICSS-32. Proceedings of the 32nd Annual Hawaii International Conference on Systems Sciences. vol. 2. Track 2. Digital Object Identifier: 10.1109/HICSS. 1999.772692. pp. 2036-2048. 12 pages.
Ma, J.; Zhang, J.; Lu, H.; and Xue, X. (2007). Semantic Information Extraction of Video Based on Ontology and Inference. ICSC 2007. International Conference on Semantic Computing. Digital Object Identifier: 10.1109/ICSC.2007.12. vol. 1. pp. 721-726. 6 pages.
Ozcan, R.; and Aslandogan, Y.A. (2005). Concept-based information access. Proceedings of the International Conference on Information Technology: Coding and Computing. ITCC 2005. vol. 1. Digital Object Identifier: 10.1109/ITCC.2005.111. pp. 794-799. 6 pages.
Storey, V.C. (2005). Comparing Relationships in Conceptual Modeling: Mapping to Semantic Classifications. IEEE Transactions on Knowledge and Data Engineering. vol. 17. Issue 11. Digital Object Identifier: 10.1109/TKDE.2005.175. pp. 1478-1489. 12 pages.
Chinese Office Action for Chinese Application No. 200780032062.9, Issued May 17, 2011.
International Search Report and Written Opinion for PCT/CA2007/001546 dated Dec. 28, 2007.
International Preliminary Report on Patentability for PCT/CA2007/001546 dated Dec. 19, 2008.
International Search Report and Written Opinion for PCT/CA2009/000567 mailed Aug. 24, 2009.
International Preliminary Report on Patentability for PCT/CA2009/000567 mailed Nov. 11, 2010.
International Search Report and Written Opinion for PCT/CA2009/001185 mailed Dec. 3, 2009.
International Preliminary Report on Patentability for PCT/CA2009/001185 mailed Mar. 10, 2011.
International Search Report and Written Opinion for PCT/CA2010/001382 mailed Jan. 13, 2011.
International Preliminary Report on Patentability for PCT/CA2010/001382 mailed Mar. 22, 2012.
International Search Report and Written Opinion for PCT/CA2010/001772 dated Apr. 28, 2011.
International Preliminary Report on Patentability for PCT/CA2010/001772 dated May 24, 2012.
International Search Report and Written Opinion for PCT/CA2011/000718 mailed Oct. 13, 2011.
International Search Report and Written Opinion for PCT/CA2011/000719 mailed Sep. 28, 2011.
International Search Report and Written Opinion for PCT/CA2011/000745 mailed Sep. 22, 2011.
International Search Report and Written Opinion for PCT/CA2011/001382 mailed Apr. 24, 2012.
International Search Report and Written Opinion for PCT/CA2011/001402, mailed Apr. 24, 2012.
International Search Report and Written Opinion for PCT/CA2011/001403 mailed May 23, 2012.
International Search Report and Written Opinion for PCT/CA2012/000007 mailed Apr. 20, 2012.
International Search Report and Written Opinion for PCT/CA2012/000009 mailed May 1, 2012.
Office Action for U.S. Appl. No. 11/625,452 mailed Mar. 30, 2009.
Office Action for U.S. Appl. No. 11/625,452 mailed Dec. 7, 2009.
Office Action for U.S. Appl. No. 11/625,452 mailed Mar. 26, 2010.
Office Action for U.S. Appl. No. 12/477,994 mailed Aug. 31, 2010.
Office Action for U.S. Appl. No. 12/477,977 mailed Sep. 28, 2010.
Office Action for U.S. Appl. No. 11/469,258 mailed Aug. 21, 2008.
Interview Summary for U.S. Appl. No. 11/469,258 mailed Dec. 16, 2008.
Office Action for U.S. Appl. No. 11/550,457 mailed Dec. 15, 2008.
Office Action for U.S. Appl. No. 12/556,349 mailed Jun. 29, 2010.
Office Action for U.S. Appl. No. 12/441,100 mailed Jun. 9, 2011.
Office Action for U.S. Appl. No. 12/441,100 mailed Jan. 24, 2012.
Advisory Action for U.S. Appl. No. 12/441,100 mailed May 4, 2012.
Office Action for U.S. Appl. No. 12/549,812 mailed Oct. 1, 2012.
Office Action for U.S. Appl. No. 12/555,222 nailed Jan. 27, 2012.
Office Action for U.S. Appl. No. 12/555,222 mailed Oct. 31, 2012.
Office Action for U.S. Appl. No. 12/555,341 mailed Feb. 9, 2012.
Office Action for U.S. Appl. No. 12/555,341 mailed Aug. 1, 2012.
Office Action for U.S. Appl. No. 12/615,703 mailed Feb. 1, 2012.
Office Action for U.S. Appl. No. 13/105,890 mailed Jun. 26, 2012.
[No Author Listed] "Faceted Classification and Adaptive Concept Matching," Gemstone Business Intelligence Ltd., Feb. 2006. pp. 1-7. 7 pages.
Anick et al., Interactive document retrieval using faceted terminological feedback. HICSS-32. Proceedings of the 32nd Annual Hawaii International Conference on Systems Sciences. 1999;2(2):2036-2048. Digital Object Identifier: 10.1109/HICSS.1999.772692.
Blei et al., Hierarchical bayesian models for applications in information retrieval. In: Bayesian Statistics 7. Bernardo et al., eds. 2003:25-43.
Bollegala et al., Measuring semantic similarity between words using web searches engines. Proceedings of 16th International Conference on World Wide Web. 2007;757-66.
Brewster et al., User-Centered Ontology Learning for Knowledge Management. 7th International Workshop on Applications of Natural Language to Information Systems, Stockholm, Jun. 27-28, 2002. Lecture Notes in Computer Sciences, Springer Verlag. 2002:12 pages.
Brewster et al., User-Centered Ontology Learning for Knowledge Management. 7th International Workshop on Applications of Natural Language to Information Systems, Stockholm, Jun. 27-28, 2002. Lecture Notes in Computer Sciences, Springer Verlag. 2002:203-207. 5 pages.
Dakka et al., Automatic Extraction of Useful Facet Hierarchies from Text Databases. Data Engineering. IEEE 24th International Conference on Apr. 7-12, 2008. ICDE 2008:466-475. Digital Object Identifier 10.1109/ICDE.2008.4467455.
Fikadu et al., A Framework for Personalized Information Retrieval Model. Conference Proceedings, Second International Conference on Computer and Network Technology (ICCNT), IEEE, Piscataway, NJ, USA Apr. 23, 2010, pp. 500-505.
Gabrilovich et al., Computing semantic relatedness using wikipedia-based explicit semantic analysis. Proceedings of 20th International Joint Conference on Artificial Intelligence. 2007;1606-11.
Hassan-Montero et al., Improving tag-clouds as visual information retrieval interfaces, International Conference on Multidisciplinary Information Sciences and Technologies, InSciT2006. Oct. 25-28, 2006, Merida, Spain. 6 pages.

(56) References Cited

OTHER PUBLICATIONS

Hiemstra, A probabilisitc justification for using tf-idf term weighting in information retrieval. International Journal on Digital Libraries. 2000;3(2):131-39.

Jiang et al., Semantic similarity based on corpus statistics and lexical taxonomy. Proceedings of International Conference Research on Computational Linguistics. 1997; 15 pages.

Jones, A statistical interpretation of term specificity and its applications in retrieval. Journal of Documentation. 2004;60(5):493-502.

Kaser et al., Tag-Cloud Drawing: Algorithms for Cloud Visualization, arXiv:cs/0703109v2 [cs.DS] May 7, 2007.

Lewis, Naive (bayes) at forty: The independence assumption in information retrieval. Lecture Notes in Computer Science. 1998;1398:4-15.

Ma et al., Semantic Information Extraction of Video Based on Ontology and Inference. ICSC 2007. International Conference on Semantic Computing. 2007;1:721-726. Digital Object Identifier: 10.1109/ICSC.2007.12.

Metzler et al., A markov random field model for term dependencies. Proceedings of SIGIR 2005. 2005:472-79.

Ozcan et al., Concept-based information access. Proceedings of the International Conference on Information Technology: Coding and Computing. ITCC 2005;1:794-799. Digital Object Identifier: 10.1109/ITCC.2005.111.

Payne et al., Calendar Agents on the Semantic Web. IEEE Intelligent Systems. Jun. 2002;17(3):84-86.

Robertson, Understanding inverse document frequency: On theoretical arguments for ids. Journal of Documentation. 2004;60(5):503-20.

Rocha, Adaptive Webs for Heterarchies with Diverse Communities of Users. Paper prepared for the workshop from Intelligent Networks to the Global Brain: Evolutionary Social Organization through Knowledge Technology, Brussels, Jul. 3-5, 2001. LAUR005173. 35 pages.

Seco et al., An intrinsic information content metric for semantic similarity in wordnet. Proceedings of 16th European Conference on Artifical Intelligence. 2004;1089-90.

Slavic et al., Core Requirements for Automation of Analytico-Synthetic Classifications. Advances in Knowledge Organization. 2004;9:187-192.

Song et al., A conceptual graph approach to semantic similarity computation method for e-service discovery. International Journal on Knowledge Engineering and Data Mining. 2010;1(1):50-68.

Storey, Comparing Relationships in Conceptual Modeling: Mapping to Semantic Classifications. IEEE Transactions on Knowledge and Data Engineering. 2005;17(11):1478-1489. Digital Object Identifier: 10.1109/.

Terra et al., Frequency estimates for statistical word similarity measures. Proceedings of 2003 Conference of the North American Chapter of the Association for Computational Linguistics on Human Language Technology. 2003:165-172.

Wang et al., Gene expression correlation and gene ontology-based similarity: An assesment of quantitative relationships. Proceedings of IEEE Symposium on Computational Intelligence in Bioinformatics and Computational Biology. 2004:25-31.

Wu et al., Interpreting tf-idf term weights as making relevance decisions. ACM Transactions on Information Systems. 2008;26(3):Article No. 13.

Zhai, Statistical language models for information retrieval—a critical review. Foundations and Trends in Information Retrieval. 2008;2(3):137-213.

Zhang et al., Bootstrapping Ontology Learning for Information Retrieval Using Formal Concept Analysis and Information Anchors. 14th International Conference on Conceptual Structures Aalborg, Denmark. Jul. 2006. 14 pages.

Office Action for U.S. Appl. No. 13/345,637 dated Sep. 5, 2014.
Interview Summary for U.S Appl. No. 13/345,640 mailed Dec. 5, 2013.
Notice of Allowance for U.S. Appl. No. 13/345,640 mailed Dec. 26, 2013.
Notice of Allowance for U.S. Appl. No. 13/345,640 mailed Apr. 14, 2014.
Office Action for U.S. Appl. No. 13/345,644 dated Nov. 6, 2013.
Office Action for U.S. Appl. No. 13/345,644 dated Nov. 26, 2014.
Office Action for U.S. Appl. No. 13/609,218 dated Dec. 30, 2013.
Office Action for U.S. Appl. No. 13/609,218 dated Nov. 4, 2014.
Office Action for U.S. Appl. No. 13/609,225 dated Nov. 21, 2013.
Office Action for U.S. Appl. No. 13/609,225 dated Oct. 6, 2014.

\* cited by examiner

FIG. 8

| Rule / Input KR | Taxonomy | Synonym Ring | Thesaurus | Faceted Classification | Ontology |
|---|---|---|---|---|---|
| Rule 1: Coherent Concepts | X | X | X | X | X |
| Rule 2: Hierarchical Relationships | X | X | X | X | X |
| Rule 3: Synonym Concepts | | X | X | | |
| Rule 4: Related Concepts | | | X | X | X |
| Rule 5: Faceted Hierarchies | | | | X | X |
| Rule 6: Labeled Concepts | | | | X | X |

SYSTEMS AND METHODS FOR ANALYZING AND SYNTHESIZING COMPLEX KNOWLEDGE REPRESENTATIONS

CROSS-REFERENCE TO RELATED APPLICATIONS

The present application claims the benefit under 35 U.S.C. §119(e) of U.S. Provisional Patent Application No. 61/357,266, titled "Systems and Methods for Analyzing and Synthesizing Complex Knowledge Representations, filed Jun. 22, 2010, which is hereby incorporated by reference in its entirety. The present application is also a continuation-in-part of U.S. patent application Ser. No. 12/477,977, titled "System, Method and Computer Program for Transforming an Existing Complex Data Structure to Another Complex Data Structure," filed Jun. 4, 2009, which application is a continuation of U.S. patent application Ser. No. 11/625,452, titled "System, Method and Computer Program for Faceted Classification Synthesis," filed Jan. 22, 2007, now U.S. Pat. No. 7,849,090, which application is a continuation-in-part of U.S. patent application Ser. No. 11/550,457, titled "System, Method and Computer Program for Facet Analysis," filed Oct. 18, 2006, now U.S. Pat. No. 7,606,781, which application is a continuation-in-part of U.S. patent application Ser. No. 11/469,258, titled "Complex-Adaptive System for Providing a Faceted Classification," filed Aug. 31, 2006, now U.S. Pat. No. 7,596,574, which application is a continuation-in-part of U.S. patent application Ser. No. 11/392,937, titled "System, Method, and Computer Program for Constructing and Managing Dimensional Information Structures," filed Mar. 30, 2006, which application claims a priority benefit under 35 U.S.C. §119(e) to U.S. Provisional Patent Application No. 60/666,166, titled "System, Method and Computer Program for Constructing and Managing Multi-Dimensional Information Structures in a Decentralized Collaborative Environment," filed Mar. 30, 2005, all of which are hereby incorporated by reference in their entireties.

BACKGROUND OF THE INVENTION

Broadly, knowledge representation is the activity of making abstract knowledge explicit, as concrete data structures, to support machine-based storage, management, and reasoning systems. Conventional methods and systems exist for utilizing knowledge representations (KRs) constructed in accordance with various types of knowledge representation models, including structured controlled vocabularies such as taxonomies, thesauri and faceted classifications; formal specifications such as semantic networks and ontologies; and unstructured forms such as documents based in natural language.

A taxonomy is a KR structure that organizes categories into a hierarchical tree and associates categories with relevant objects such as physical items, documents or other digital content. Categories or concepts in taxonomies are typically organized in terms of inheritance relationships, also known as supertype-subtype relationships, generalization-specialization relationships, or parent-child relationships. In such relationships, the child category or concept has the same properties, behaviors and constraints as its parent plus one or more additional properties, behaviors or constraints. For example, the statement of knowledge, "a dog is a mammal," can be encoded in a taxonomy by concepts/categories labeled "mammal" and "dog" linked by a parent-child hierarchical relationship. Such a representation encodes the knowledge that a dog (child concept) is a type of mammal (parent concept), but not every mammal is necessarily a dog.

A thesaurus is a KR representing terms such as search keys used for information retrieval, often encoded as single-word noun concepts. Links between terms/concepts in thesauri are typically divided into the following three types of relationships: hierarchical relationships, equivalency relationships and associative relationships. Hierarchical relationships are used to link terms that are narrower and broader in scope than each other, similar to the relationships between concepts in a taxonomy. To continue the previous example, "dog" and "mammal" are terms linked by a hierarchical relationship. Equivalency relationships link terms that can be substituted for each other as search terms, such as synonyms or near-synonyms. For example, the terms "dog" and "canine" could be linked through an equivalency relationship in some contexts. Associative relationships link related terms whose relationship is neither hierarchical nor equivalent. For example, a user searching for the term "dog" may also want to see items returned from a search for "breeder", and an associative relationship could be encoded in the thesaurus data structure for that pair of terms.

Faceted classification is based on the principle that information has a multi-dimensional quality, and can be classified in many different ways. Subjects of an informational domain are subdivided into facets (or more simply, categories) to represent this dimensionality. The attributes of the domain are related in facet hierarchies. The objects within the domain are then described and classified based on these attributes. For example, a collection of clothing being offered for sale in a physical or web-based clothing store could be classified using a color facet, a material facet, a style facet, etc., with each facet having a number of hierarchical attributes representing different types of colors, materials, styles, etc. Faceted classification is often used in faceted search systems, for example to allow a user to search the collection of clothing by any desired ordering of facets, such as by color-then-style, by style-then-color, by material-then-color-then-style, or by any other desired prioritization of facets. Such faceted classification contrasts with classification through a taxonomy, in which the hierarchy of categories is fixed.

A semantic network is a network structure, or data structure encoding or instantiating a network structure, that represents various types of semantic relationships between concepts. A semantic network is typically represented as a directed or undirected graph consisting of vertices representing concepts, and edges labeled with the types of relationships linking pairs of concepts. An example of a semantic network is WordNet, a lexical database of the English language. Some common types of semantic relationships defined in WordNet are meronymy (A is part of B), hyponymy (A is a kind of B), synonymy (A denotes the same as B) and antonymy (A denotes the opposite of B).

An ontology is a KR structure encoding concepts and relationships between those concepts that is restricted to a particular domain of the real or virtual world that it is used to model. The concepts included in an ontology typically represent the particular meanings of terms as they apply to the domain being modeled or classified, and the included concept relationships typically represent the ways in which those concepts are related within the domain. For example, concepts corresponding to the word "card" could have different meanings in an ontology about the domain of poker and an ontology about the domain of computer hardware.

In general, all of the above-discussed types of KRs, as well as other conventional examples, are tools for modeling human knowledge in terms of abstract concepts and the relationships between those concepts, and for making that knowledge accessible to machines such as computers for performing various knowledge-requiring tasks. As such, human users and software developers conventionally construct KR data structures using their human knowledge, and manually encode the completed KR data structures into machine-readable form as data structures to be stored in machine memory and accessed by various machine-executed functions.

SUMMARY OF THE INVENTION

One embodiment is directed to a method for generating a complex knowledge representation, the method comprising receiving input indicating a request context; applying, with a processor, one or more rules to an elemental data structure representing at least one elemental concept, at least one elemental concept relationship, or at least one elemental concept and at least one elemental concept relationship; based on the application of the one or more rules, synthesizing, in accordance with the request context, one or more additional concepts, one or more additional concept relationships, or one or more additional concepts and one or more additional concept relationships; and using at least one of the additional concepts, at least one of the additional concept relationships, or at least one of the additional concepts and at least one of the additional concept relationships, generating a complex knowledge representation in accordance with the request context.

Another embodiment is directed to a system for generating a complex knowledge representation, the system comprising at least one non-transitory computer-readable storage medium storing processor-executable instructions that, when executed by at least one processor, perform receiving input indicating a request context, applying one or more rules to an elemental data structure representing at least one elemental concept, at least one elemental concept relationship, or at least one elemental concept and at least one elemental concept relationship, based on the application of the one or more rules, synthesizing, in accordance with the request context, one or more additional concepts, one or more additional concept relationships, or one or more additional concepts and one or more additional concept relationships, and using at least one of the additional concepts, at least one of the additional concept relationships, or at least one of the additional concepts and at least one of the additional concept relationships, generating a complex knowledge representation in accordance with the request context.

Another embodiment is directed to at least one non-transitory computer-readable storage medium encoded with a plurality of computer-executable instructions for generating a complex knowledge representation, wherein the instructions, when executed, perform receiving input indicating a request context; applying one or more rules to an elemental data structure representing at least one elemental concept, at least one elemental concept relationship, or at least one elemental concept and at least one elemental concept relationship; based on the application of the one or more rules, synthesizing, in accordance with the request context, one or more additional concepts, one or more additional concept relationships, or one or more additional concepts and one or more additional concept relationships; and using at least one of the additional concepts, at least one of the additional concept relationships, or at least one of the additional concepts and at least one of the additional concept relationships, generating a complex knowledge representation in accordance with the request context.

Another embodiment is directed to a method for deconstructing an original knowledge representation, the method comprising receiving input corresponding to the original knowledge representation; applying, with a processor, one or more rules to deconstruct the original knowledge representation into one or more elemental concepts, one or more elemental concept relationships, or one or more elemental concepts and one or more elemental concept relationships; and including representation of at least one of the elemental concepts, at least one of the elemental concept relationships, or at least one of the elemental concepts and at least one of the elemental concept relationships in an elemental data structure.

Another embodiment is directed to a system for deconstructing an original knowledge representation, the system comprising at least one non-transitory computer-readable storage medium storing processor-executable instructions that, when executed by at least one processor, perform receiving input corresponding to an original knowledge representation, applying one or more rules to deconstruct the original knowledge representation into one or more elemental concepts, one or more elemental concept relationships, or one or more elemental concepts and one or more elemental concept relationships, and including representation of at least one of the elemental concepts, at least one of the elemental concept relationships, or at least one of the elemental concepts and at least one of the elemental concept relationships in an elemental data structure.

Another embodiment is directed to at least one non-transitory computer-readable storage medium encoded with a plurality of computer-executable instructions for deconstructing an original knowledge representation, wherein the instructions, when executed, perform receiving input corresponding to the original knowledge representation; applying one or more rules to deconstruct the original knowledge representation into one or more elemental concepts, one or more elemental concept relationships, or one or more elemental concepts and one or more elemental concept relationships; and including representation of at least one of the elemental concepts, at least one of the elemental concept relationships, or at least one of the elemental concepts and at least one of the elemental concept relationships in an elemental data structure.

Another embodiment is directed to a method for supporting semantic interoperability between knowledge representations, the method comprising, for each input knowledge representation of a plurality of input knowledge representations, applying, with a processor, one or more rules to deconstruct the input knowledge representation into one or more elemental concepts, one or more elemental concept relationships, or one or more elemental concepts and one or more elemental concept relationships; and with a processor, including representation of at least one of the elemental concepts, at least one of the elemental concept relationships, or at least one of the elemental concepts and at least one of the elemental concept relationships for each of the plurality of input knowledge representations in a shared elemental data structure.

Another embodiment is directed to a system for supporting semantic interoperability between knowledge representations, the system comprising at least one non-transitory computer-readable storage medium storing processor-executable instructions that, when executed by at least one processor, perform, for each input knowledge representation of a plurality of input knowledge representations, applying one or more rules to deconstruct the input knowledge representation into one or more elemental concepts, one or more elemental concept relationships, or one or more elemental concepts and one or more elemental concept relationships; and including representation of at least one of the elemental concepts, at least one of the elemental concept relationships, or at least one of the elemental concepts and at least one of the elemental concept relationships for each of the plurality of input knowledge representations in a shared elemental data structure.

Another embodiment is directed to at least one non-transitory computer-readable storage medium encoded with a plurality of computer-executable instructions for supporting semantic interoperability between knowledge representations, wherein the instructions, when executed, perform, for each input knowledge representation of a plurality of input knowledge representations, applying one or more rules to deconstruct the input knowledge representation into one or more elemental concepts, one or more elemental concept relationships, or one or more elemental concepts and one or more elemental concept relationships; and including representation of at least one of the elemental concepts, at least one of the elemental concept relationships, or at least one of the elemental concepts and at least one of the elemental concept relationships for each of the plurality of input knowledge representations in a shared elemental data structure.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 8 is a table illustrating an exemplary set of knowledge processing rules in accordance with some embodiments of the present invention;

DETAILED DESCRIPTION

Figure 1:
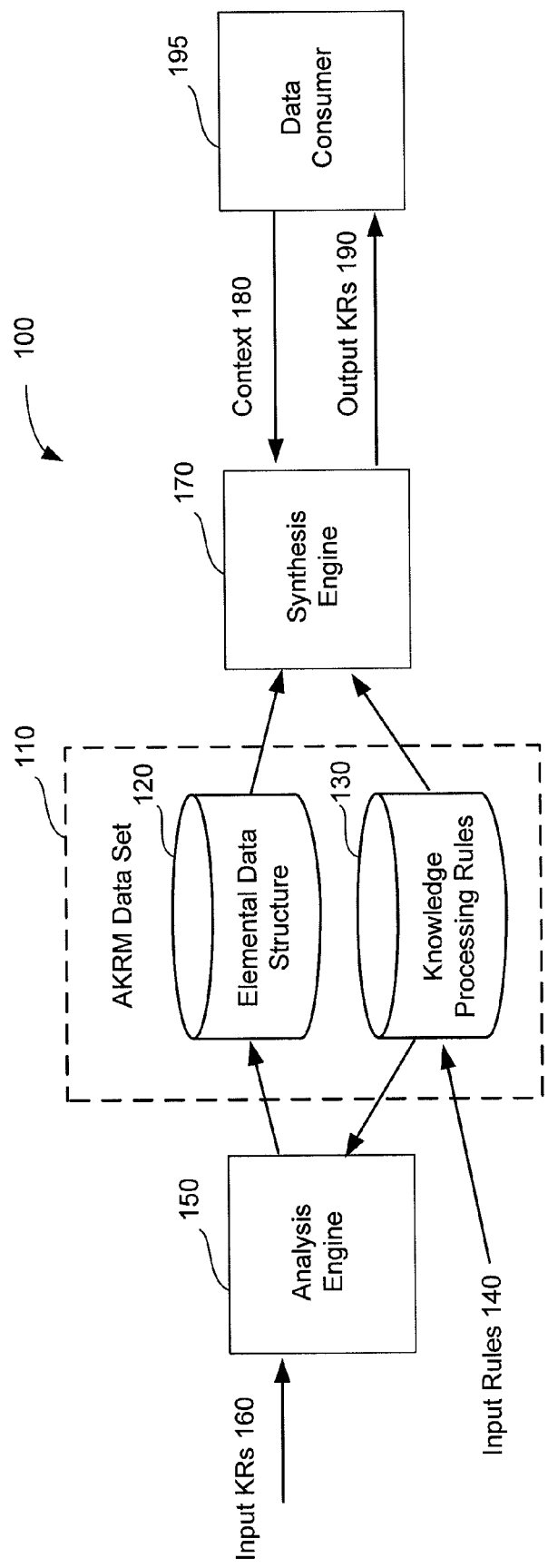
FIG. 1 is a block diagram illustrating an exemplary system for implementing an atomic knowledge representation model in accordance with some embodiments of the present invention.

As discussed above, a knowledge representation (KR) data structure created through conventional methods encodes and represents a particular set of human knowledge being modeled for a particular domain or context. As KRs are typically constructed by human developers and programmed in completed form into machine memory, a conventional KR contains only that subset of human knowledge with which it is originally programmed by a human user.

For example, a KR might encode the knowledge statement, "a dog is a mammal," and it may also express statements or assertions about animals that are mammals, such as, "mammals produce milk to feed their young." The inventor has recognized that such a combination of facts, when combined with appropriate logical and semantic rules, can support a broad range of human reasoning, making explicit various inferences that were not initially seeded as fact within the KR, such as, "dogs produce milk to feed their young." The inventor has appreciated that expansions of KR data structures through such inferences may be used to support a variety of knowledge-based activities and tasks, such as inference/reasoning (as illustrated above), information retrieval, data mining, and other forms of analysis.

However, as discussed above, methods for constructing and encoding KRs have conventionally been limited to manual input of complete KR structures for access and use by machines such as computers. Continuing the example above, although a human person acting as the KR designer may implicitly understand why the fact "dogs produce milk to feed their young" is true, the properties that must hold to make it true (in this case, properties such as transitivity and inheritance) are not conventionally an explicit part of the KR. In other words, any underlying set of rules that may guide the creation of new knowledge is not conventionally encoded as part of the KR, but rather is applied from outside the system in the construction of the KR by a human designer.

A previously unrecognized consequence of conventional approaches is that knowledge can be expressed in a KR for use by machines, but the KR itself cannot be created by machines. Humans are forced to model domains of knowledge for machine consumption. Unfortunately, because human knowledge is so tremendously broad and in many cases subjective, it is not technically feasible to model all knowledge domains.

Furthermore, since so much of the knowledge must be explicitly encoded as data, the resulting data structures quickly become overwhelmingly large as the domain of knowledge grows. Since conventional KRs are not encoded with their underlying theories or practices for knowledge creation as part of the data making up the knowledge representation model, their resulting data structures can become very complex and unwieldy. In other words, since the knowledge representation cannot be created by the machine, it conventionally must either be provided as explicit data or otherwise deduced or induced by logical or statistical means.

Thus, conventional approaches to KR lead to a number of problems:

Large and complex data structures: The data structures that conventionally encode knowledge representations are complex to build and maintain. Even a relatively simple domain of machine-readable knowledge (such as simple statements about dogs and mammals) can generate a volume of data that is orders of magnitude greater than its natural language counterpart.

Dependency on domain experts. The underlying theories that direct the practice of KR must be expressed by human beings in the conventional creation of a KR data structure. This is a time-consuming activity that excludes most people and all machines in the production of these vital data assets. As a result, most of human knowledge heretofore has remained implicit and outside the realm of computing.

Data created before use: Knowledge is conventionally modeled as data before such time as it is called for a particular use, which is expensive and potentially wasteful if that knowledge is not needed. Accordingly, the inventor has recognized that, if the knowledge could be created by machines only as needed, it could greatly decrease data production and storage requirements.

Large-scale data and processing costs: Conventional KR systems must reason over very large data structures in the service of creating new facts or answering queries. This burden of scale represents a significant challenge in conventional KR systems, a burden that could be reduced by using more of a just-in-time method for creating the underlying data structures, rather than the conventional data-before-use methods.

Integration and interoperability challenges: Semantic interoperability (the ability for two different KRs to share knowledge) is a massively difficult challenge when various KRs are created under different models and expressed in different ways, often dealing with subjective and ambiguous subjects. Precision and the ability to reason accurately are often lost across multiple different KRs. In this respect, the inventor has appreciated that, if the underlying theories for how the knowledge was created were included as part of the KR, then reconciliation of knowledge across different KRs may become a tractable problem.

Accordingly, some embodiments in accordance with the present disclosure provide a system that encodes knowledge creation rules to automate the process of creating knowledge representations. Some embodiments combine new synthetic approaches to knowledge representation with computing systems for creating and managing the resulting data structures derived from such approaches.

Rather than modeling all the knowledge in the domain as explicit data, some embodiments combine a more compressed (atomic) data set with a set of generative rules that encode the underlying knowledge creation. Such rules may be applied by the system in some embodiments when needed or desired to create new knowledge and express it explicitly as data. It should be appreciated from the above discussion that a benefit of such techniques may be, in at least some situations, to reduce the amount of data in the system substantially, as well as to provide new capabilities and applications for machine-based creation (synthesis) of new knowledge. However, it should be appreciated that not every embodiment in accordance with the present invention may address every identified problem of conventional approaches, and some embodiments may not address any of these problems. Some embodiments may also address problems other than those recited here. Moreover, not every embodiment may provide all or any of the benefits discussed herein, and some embodiments may provide other benefits not recited.

Some embodiments also provide techniques for complex knowledge representations such as taxonomies, ontologies, and faceted classifications to interoperate, not just at the data level, but also at the semantic level (interoperability of meaning).

Other benefits that may be afforded in some embodiments and may be applied across many new and existing application areas include: lower costs in both production and application of knowledge representations afforded by simpler and more economical data structures; possibilities for new knowledge creation; more scalable systems afforded by just-in-time, as-needed knowledge; and support of "context" from users and data consumers as input variables. The dynamic nature of some embodiments in accordance with the present disclosure, which apply synthesis and analysis knowledge processing rules on a just-in-time basis to create knowledge representation data structures, may provide more economical benefits than conventional methods that analyze and model an entire domain of knowledge up front.

By incorporating an underlying set of rules of knowledge creation within the KR, the amount of data in the system may be reduced, providing a more economical system of data management, and providing entirely new applications for knowledge management. Thus, in some embodiments, the cost of production and maintenance of KR systems may be lowered by reducing data scalability burdens, with data not created unless it is needed. Once created, the data structures that model the complex knowledge in some embodiments are comparatively smaller than in conventional systems, in that they only contain the data relevant to the task at hand. This in turn may reduce the costs of downstream applications such as inference engines or data mining tools that work over these knowledge models.

The synthetic, calculated approach of some embodiments in accordance with the present disclosure also supports entirely new capabilities in knowledge representation and data management. Some embodiments may provide improved support for "possibility", i.e., creating representations of entirely new knowledge out of existing data. For example, such capability of possibility may be useful for creative activities such as education, journalism, and the arts.

FIG. 1 illustrates an exemplary system 100 that may be employed in some embodiments for implementing an atomic knowledge representation model (AKRM) involved in analysis and synthesis of complex knowledge representations (KRs), in accordance with some embodiments of the present invention. In an exemplary system 100, an AKRM may be encoded as computer-readable data and stored on one or more tangible, non-transitory computer-readable storage media. For example, an AKRM may be stored in a data set 110 in non-volatile computer memory, examples of which are given below, with a data schema designed to support both elemental and complex knowledge representation data structures.

In some embodiments, an AKRM may include one or more elemental data structures 120 and one or more knowledge processing rules 130. In some embodiments, rules 130 may be used by system 100 to deconstruct (analyze) one or more complex KRs to generate an elemental data structure 120. For example, system 100 may include one or more computer processors and one or more computer memory hardware components, and the memory may be encoded with computer-executable instructions that, when executed by the one or more processors, cause the one or more processors of system 100 to use the rules 130 in the analysis of one or more complex KRs to generate elemental data structure 120 of the AKRM. The memory may also be encoded with instructions that program the one or more processors to use the rules 130 to synthesize new complex KRs from elemental data structure 120. In some embodiments, the computer memory may be implemented as one or more tangible, non-transitory computer-readable storage media encoded with computer-executable instructions that, when executed, cause one or more processors to perform any of the functions described herein.

Unlike previous knowledge representation systems, a system in accordance with some embodiments of the present invention, such as system 100, may combine data structures and knowledge processing rules to create knowledge representation models encoded as data. In some embodiments, rules may not be encoded as knowledge (e.g., as rules or axioms that describe the boundaries or constraints of knowledge within a particular domain), but rather as constructive and deconstructive rules for creating the data structures that represent new knowledge. In addition to "inference rules" for generating implicit facts that are logical consequences of the explicit concepts given by an original KR, in some embodiments a knowledge representation model may be encoded with "knowledge processing rules" that can be applied to create new knowledge that may not be implicit from the original KR data structure.

For example, starting with two explicit knowledge statements, "Mary is a person," and, "All people are humans," inference rules may be applied to determine the implicit knowledge statement, "Mary is a human," which is a logical consequence of the previous two statements. In a different example in accordance with some embodiments of the present invention, starting with two explicit knowledge statements, "Mary is a friend of Bob," and, "Bob is a friend of Charlie," exemplary knowledge processing rules modeling the meaning of friendship relationships may be applied to determine the new knowledge statement, "Mary is a friend of Charlie." Notably, application of such knowledge processing rules may result in new knowledge that is not necessarily a logical consequence of the explicit knowledge given in an original input KR. As described above, a knowledge representation model in accordance with some embodiments of the present invention, including knowledge processing rules (as opposed to or in addition to logical inference rules) stored in association with data structures encoding concepts and concept relationships, may model frameworks of how new and potentially non-implicit knowledge can be created and/or decomposed.

Such focus on the synthesis of knowledge may move a system such as system 100 into new application areas. Whereas existing systems focus on deductive reasoning (i.e., in which insights are gleaned through precise deductions of existing facts and arguments), a system in accordance with some embodiments of the present invention may support inductive reasoning as well as other types of theory-building (i.e., in which existing facts may be used to support probabilistic predictions of new knowledge).

In some embodiments in accordance with the present invention, a system such as system 100 may be based loosely on frameworks of conceptual semantics, encoding semantic primitives (e.g., "atomic" or "elemental" concepts) and rules (principles) that guide how such atomic structures can be combined to create more complex knowledge. It should be appreciated, however, that a system in accordance with embodiments of the present invention may function within many such frameworks, as aspects of the present invention are not limited to any particular theory, model or practice of knowledge representation. In some embodiments, a system such as system 100 may be designed to interface with a broad range of methods and technologies (e.g., implemented as software applications or components) that model these frameworks. For example, interfacing analysis components such as analysis engine 150 may deconstruct input complex KRs 160 to elemental data structures 120. Synthesis components such as synthesis engine 170 may construct new output complex KRs 190 using elemental data structures 120.

In some embodiments, analysis engine 150 may, for example through execution of appropriate computer-readable instructions by one or more processors of system 100, analyze an input complex KR 160 by applying one or more of the knowledge processing rules 130 to deconstruct the data structure of the input KR 160 to more elemental constructs. In some embodiments, the most elemental constructs included within the elemental data structure 120 of AKRM 110 may represent a minimum set of fundamental building blocks of information and information relationships which in the aggregate provide the information-carrying capacity with which to classify the input data structure. Input KR 160 may be obtained from any suitable source, including direct input from a user or software application interacting with system 100. In some embodiments, input KRs 160 may be obtained through interfacing with various database technologies, such as a relational or graph-based database system. It should be appreciated that input KRs 160 may be obtained in any suitable way in any suitable form, as aspects of the present invention are not limited in this respect.

Figure 2A:
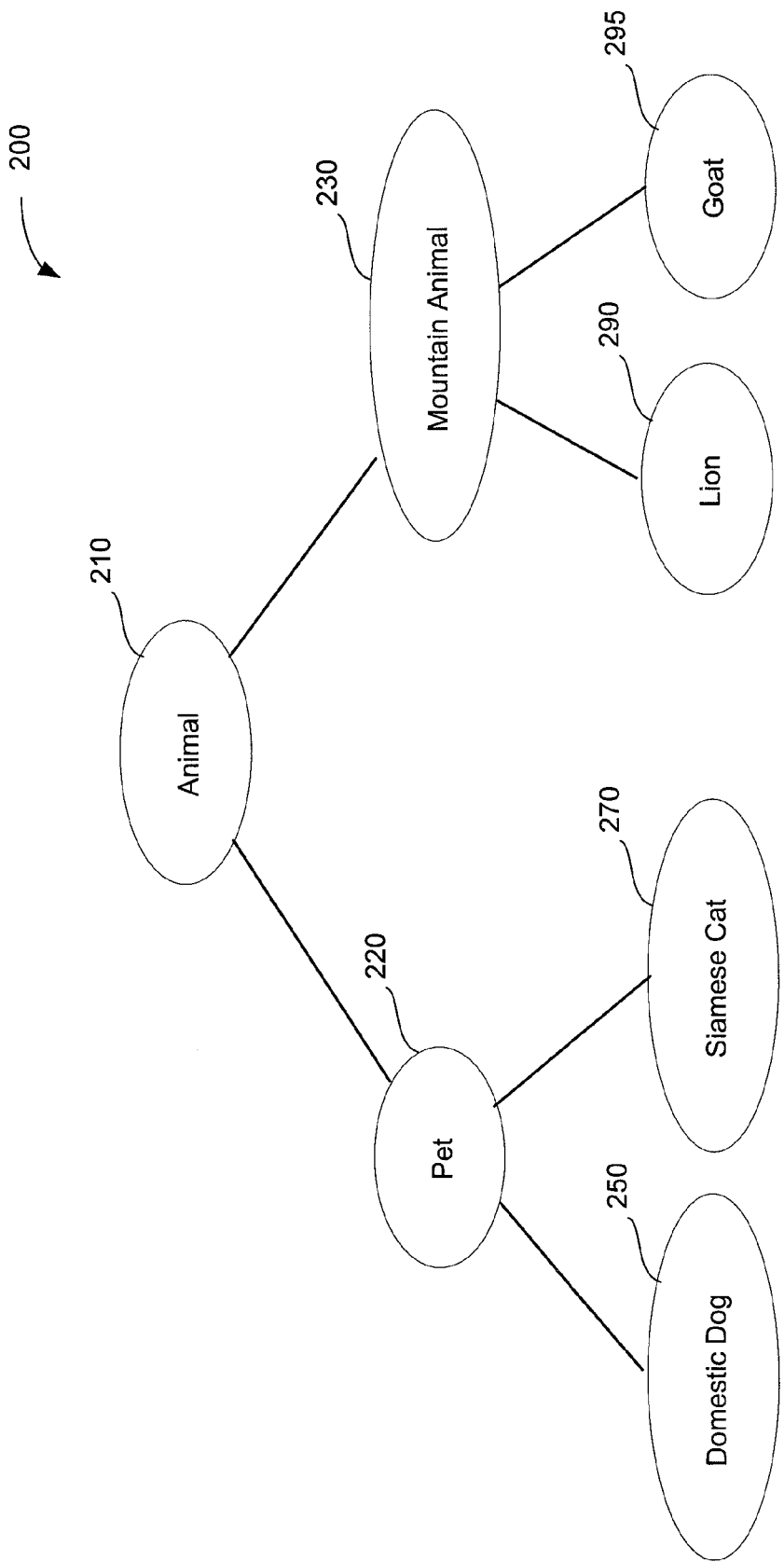
FIG. 2A illustrates an exemplary complex knowledge representation in accordance with some embodiments of the present invention.

For example, FIG. 2A illustrates a small complex KR 200 (in this example, a taxonomy) that may be input to analysis engine 150, e.g., by a user or a software application using system 100. Complex KR 200 includes a set of concepts linked by various hierarchical relationships. For example, concept 210 labeled "Animal" is linked in parent-child relationships to concept 220 labeled "Pet" and concept 230 labeled "Mountain Animal". At each level of the hierarchy, a concept entity represents a unit of meaning that can be combined to create more complex semantics or possibly deconstructed to more elemental semantics. For example, the complex meaning of "Mountain Animal" may comprise the concepts "Mountain" and "Animal".

Figure 2B:
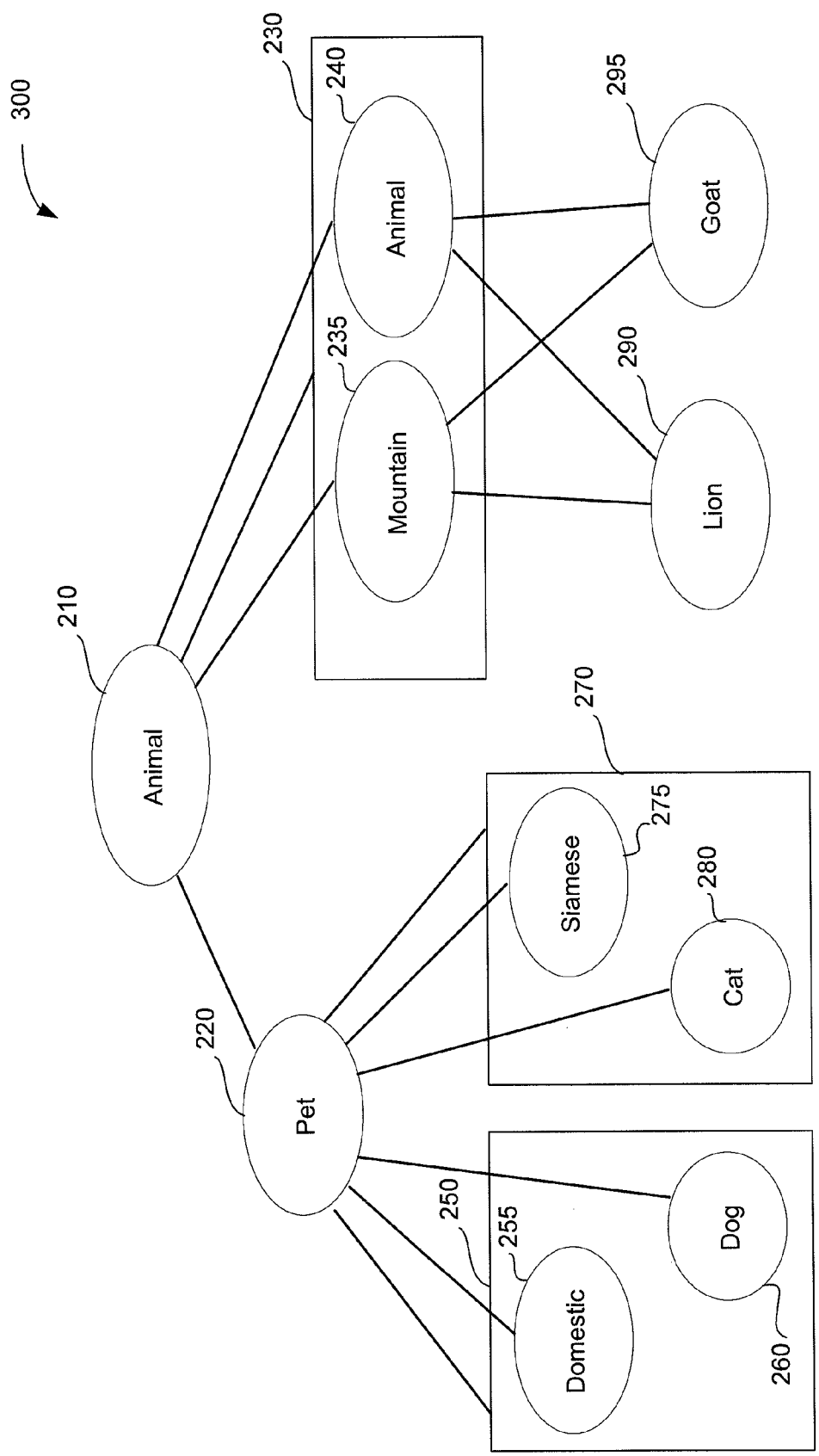
FIG. 2B illustrates an exemplary elemental data structure of an atomic knowledge representation model in accordance with some embodiments of the present invention.

In some embodiments, system 100 may, e.g., through analysis engine 150, deconstruct a complex KR such as complex KR 200 to discover the elemental concepts that comprise complex concepts of the complex KR. For example, FIG. 2B illustrates an elemental data structure 300 that may result from analysis and deconstruction of complex KR 200. In elemental data structure 300, complex concept 230 labeled "Mountain Animal" has been found to include more elemental concepts 235 labeled "Mountain" and 240 labeled "Animal". In this example, "Mountain" and "Animal" represent more elemental concepts than the more complex concept labeled "Mountain Animal", since the concepts of "Mountain" and "Animal" can be combined to create the concept labeled "Mountain Animal". Similarly, complex concept 250 labeled "Domestic Dog" has been found to include more elemental concepts 255 labeled "Domestic" and 260 labeled "Dog", and complex concept 270 labeled "Siamese Cat" has been found to include more elemental concepts 275 labeled "Siamese" and 280 labeled "Cat". In addition, each newly discovered elemental concept has inherited concept relationships from the complex concept that comprises it. Thus, "Domestic", "Dog", "Siamese" and "Cat" are children of "Pet"; "Mountain" and "Animal" (concept 240) are children of "Animal" (concept 210); and "Mountain" and "Animal" (concept 240) are both parents of both concept 290 labeled "Lion" and concept 295 labeled "Goat".

Note that, although the label "Animal" is ascribed to both concept 210 and concept 240 in elemental data structure 300, the two concepts may still represent different abstract meanings that function differently within the knowledge representation hierarchy. In some embodiments, "labels" or "symbols" may be joined to abstract concepts to provide humanand/or machine-readable terms or labels for concepts and relationships, as well as to provide the basis for various symbol-based processing methods (such as text analytics). Labels may provide knowledge representation entities that are discernable to humans and/or machines, and may be derived from the unique vocabulary of the source domain. Thus, since the labels assigned to each concept element may be drawn from the language and terms presented in the domain, the labels themselves may not fully describe the abstract concepts and concept relationships they are used to name, as those abstract entities are comprehended in human knowledge.

Similarly, in some embodiments a difference should be appreciated between abstract concepts in a knowledge representation model and the objects those concepts may be used to describe or classify. An object may be any item in the real physical or virtual world that can be described by concepts (for instance, examples of objects are documents, web pages, people, etc.). For example, a person in the real world could be represented in the abstract by a concept labeled "Bob". The information in a domain to be described, classified or analyzed may relate to virtual or physical objects, processes, and relationships between such information. In some exemplary embodiments, complex KRs as described herein may be used in the classification of content residing within Web pages. Other types of domains in some embodiments may include document repositories, recommendation systems for music, software code repositories, models of workflow and business processes, etc.

In some embodiments, the objects of the domain to be classified may be referred to as content nodes. Content nodes may be comprised of any objects that are amenable to classification, description, analysis, etc. using a knowledge representation model. For example, a content node may be a file, a document, a chunk of a document (like an annotation), an image, or a stored string of characters. Content nodes may reference physical objects or virtual objects. In some embodiments, content nodes may be contained in content containers that provide addressable (or locatable) information through which content nodes can be retrieved. For example, the content container of a Web page, addressable through a URL, may contain many content nodes in the form of text and images. Concepts may be associated with content nodes to abstract some meaning (such as the description, purpose, usage, or intent of the content node). For example, aspects of a content node in the real world may be described by concepts in an abstract representation of knowledge.

Concepts may be defined in terms of compound levels of abstraction through their relationships to other entities and structurally in terms of other, more fundamental knowledge representation entities (e.g., keywords and morphemes). Such a structure is known herein as a concept definition. In some embodiments, concepts may be related through concept relationships of two fundamental types: intrinsic, referring to joins between elemental concepts to create more complex concepts (e.g., the relationship between "Mountain", "Animal" and "Mountain Animal" in elemental data structure 300); and extrinsic, referring to joins between complex relationships. Extrinsic relationships may describe features between concept pairs, such as equivalence, hierarchy (e.g., the relationship between "Animal" and "Pet"), and associations. Further, in some embodiments the extrinsic and intrinsic concept relationships themselves may also be described as types of concepts, and they may be typed into more complex relationships. For example, an associative relationship "married-to" may comprise the relationship concepts "married" and "to".

In some embodiments, the overall organization of the AKRM data model stored as elemental data structure 120 in system 100 may be encoded as a faceted data structure, wherein conceptual entities are related explicitly in hierarchies (extrinsic relationships), as well as joined in sets to create complex concepts (intrinsic relationships). Further, these extrinsic and intrinsic relationships themselves may be typed using concepts, as discussed above. However, it should be appreciated that any suitable type of knowledge representation model or theoretical construct including any suitable types of concept relationships may be utilized in representing an AKRM, as aspects of the present invention are not limited in this respect.

Figure 3:
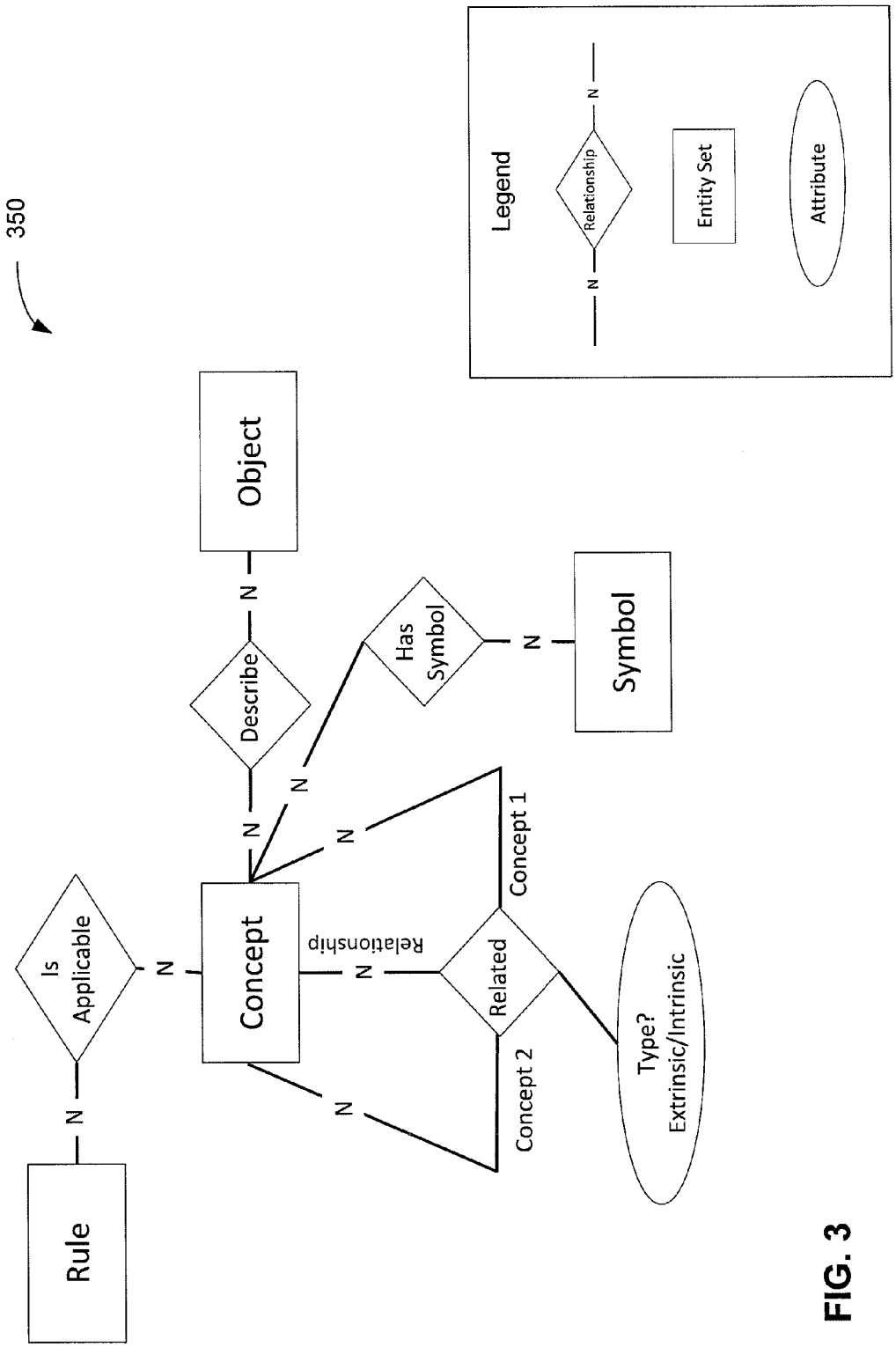
FIG. 3 illustrates an exemplary data schema in accordance with some embodiments of the present invention.

For illustration, FIG. 3 provides an exemplary data schema 350 that may be employed in the data set 110 of system 100 in accordance with some embodiments of the present invention. Such a data schema may be designed to be capable of encoding both complex knowledge representation data structures (complex KRs) such as ontologies and taxonomies, as well as the atomic knowledge representation data structures into which complex KRs are decomposed (e.g., elemental data structure 120). In schema 350, concepts may be joined to compose more complex types (has-type) using many-to-many relationships. In this way, the core concept entities in the model may represent a wide diversity of simplicity or complexity, depending on the nature of the complex knowledge representation that is being modeled by the data. By joining symbols, rules, and objects to these concepts using many-to-many relationships, such a schema may manage the data to model a broad range of knowledge representations.

In schema 350 as illustrated in FIG. 3, rectangular boxes represent entity sets, e.g., real-world objects that may be encoded as main objects in a database, as well as abstract concepts, human- and/or machine-readable symbols that reference concepts, and rules that apply to concepts in the knowledge representation. Each solid line connector represents a relationship between two entity sets, with a relationship type as represented by a diamond. "N" denotes the participation cardinality of the relationship; here, the relationships are many-to-many, indicating that many entities of each entity set can participate in a relationship with an entity of the other entity set participating in the relationship, and vice versa. By contrast, a relationship labeled "1" on both sides of the diamond would represent a one-to-one relationship; a relationship labeled "1" on one side and "N" on the other side would represent a one-to-many relationship, in which one entity of the first type could participate in the relationship with many entities of the second type, while each entity of the second type could participate in that relationship with only one entity of the first type; etc.

In some embodiments, the data structure of a knowledge representation may be encoded in accordance with schema 350 in one or more database tables, using any suitable database and/or other data encoding technique. For example, in some embodiments a data set for a KR data structure may be constructed as a computer-readable representation of a table, in which each row represents a relationship between a pair of concepts. For instance, one example of a data table could have four attribute columns, including a "concept 1" attribute, a "concept 2" attribute, a "relationship" attribute and a "type" attribute, modeling a three-way relationship for each row of the table as, "concept 1 is related to concept 2 through a relationship concept of a type (e.g., extrinsic or intrinsic)". For example, a row of such a table with the attributes (column entries) {concept 1: "Hammer"; concept 2: "Nail"; relationship: "Tool"; type: "Extrinsic"} could represent the relationship: "'Hammer' is related to 'Nail' as a 'Tool', and the relationship is "Extrinsic'." In many exemplary data structures, each concept may appear in one or more rows of a database table, for example appearing in multiple rows to represent relationships with multiple other concepts. In addition, a particular pair of concepts may appear in more than one row, for example if that pair of concepts is related through more than one type of relationship. It should be appreciated, however, that the foregoing description is by way of example only, and data structures may be implemented and/or encoded and stored in any suitable way, as aspects of the present invention are not limited in this respect.

In some embodiments, various metadata may be associated with each of the entities (e.g., concepts and concept relationships) within the AKRM to support rules-based programming. For example, since many rules would require a sorted set of concepts, a priority of concepts within concept relationships (intrinsic or extrinsic) could be added to this schema. These details are omitted here only to simplify the presentation of the data model.

Although the exemplary data schema of FIG. 3 may be relatively simple, when it is married to processing rules for constructing and deconstructing knowledge representations, it may become capable of managing a very broad range of complex knowledge (as described in various examples below). Benefits may include real-time knowledge engineering to improve data economy and reduce the need for building complexity into large knowledge representation data structures. Further, as the scope of the knowledge representation data structures is reduced, it may also have beneficial effects on integrated knowledge engineering processes, such as reasoning, analytics, data mining, and search.

Returning to FIG. 1, in some embodiments knowledge processing rules 130 may be encoded and persisted in system 100, for example in data set 110, and may be joined to concepts within input KRs 160 and/or elemental data structure 120. Rules may be joined to concepts such that given a specific concept, the rules may be applied through execution of programming code by one or more processors of system 100 to generate new semantic entities (concepts and relationships) from elemental data structure 120 and/or to deconstruct input KRs 160 into elemental entities to be included in elemental data structure 120. Examples of such rules are described in more detail below.

Rules 130 may be introduced to data set 110 as input rules 140, for example by a developer of system 100, and/or by end users of system 100 in accordance with their individual knowledge processing needs or preferences. It should be appreciated that input rules 140 may be obtained from any suitable source at any suitable time, rules 130 stored as part of the AKRM may be updated and/or changed at any suitable time by any suitable user before or during operation of system 100, and different stored rules 130 may be maintained for different users or applications that interact with system 100, as aspects of the present invention are not limited in this respect. In addition, in some embodiments different subsets of stored rules 130 may be applied to analysis of input KRs 160 than to synthesis of output KRs 190, while in other embodiments the same rules 130 may be applied in both analysis and synthesis operations, and different subsets of stored rules 130 may be applied to different types of knowledge representation.

Rules 130, when applied to concepts in analysis and synthesis of KRs, may provide the constructive and deconstructive logic for a system such as system 100. Methods of how knowledge is created (synthesized) or deconstructed (analyzed) may be encoded in sets of rules 130. Rules 130 may be designed to work symmetrically (single rules operating in both analysis and synthesis) or asymmetrically (where single rules are designed to work only in synthesis or analysis). In some embodiments, rules 130 may not be encoded as entities within a concept data structure of a knowledge model, but rather as rules within the knowledge representation model that operate in a generative capacity upon the concept data structure. In some embodiments, rules 130 may be encoded as data and stored along with the knowledge representation data structures, such as elemental data structure 120, in a machine-readable encoding of an AKRM including rules. Rules 130 may be applied using a rules engine software component, e.g., implemented by programming instructions encoded in one or more tangible, non-transitory computer-readable storage media included in or accessible by system 100, executed by one or more processors of system 100 to provide the rules engine.

Given the probabilistic nature of a system such as system 100 in accordance with some embodiments of the present invention, methods for checking the semantic coherence for the knowledge representation data structures resulting from application of rules 130 may be performed. In some embodiments, system 100 may be programmed to gather evidence as to whether the resulting data structures present in existing knowledge models. These existing knowledge models may be internal to the system (as complex knowledge representation data structures) or external (such as knowledge models encoded on the Semantic Web). In some embodiments, a search engine may be used to investigate whether terms (symbols or labels) associated with concepts of the resulting data structures present in external knowledge representations (such as documents). The term-document frequency (e.g., number of search engine hits) may provide one exemplary metric for the semantic coherence of the resulting knowledge representation data structures. However, it should be appreciated that any suitable metric for semantic coherence of such data structures may be utilized, as aspects of the present invention are not limited in this respect.

Analysis engine 150 and synthesis engine 170 may use any of various methods of semantic analysis and synthesis to support the construction and deconstruction of knowledge representation data structures, as aspects of the present invention are not limited in this respect. Examples of analytical methods that may be used by analysis engine 150, along with application of rules 130, in deconstructing input complex KRs 160 include text analyses, entity and information extraction, information retrieval, data mining, classification, statistical clustering, linguistic analyses, facet analysis, natural language processing and semantic knowledge-bases (e.g. lexicons, ontologies, etc.). Examples of synthetic methods that may be used by synthesis engine 170, along with application of rules 130, in constructing complex KRs 190 include formal concept analysis, faceted classification synthesis, semantic synthesis and dynamic taxonomies.

It should be appreciated that exemplary methods of analysis and synthesis of complex KRs may be performed by analysis engine 150 and synthesis engine 170 operating individually and/or in conjunction with any suitable external software application that may interface with the engines and/or system 100. Such external software applications may be implemented within the same physical device or set of devices as other components of system 100, or parts or all of such software applications may be implemented in a distributed fashion in communication with other separate devices, as aspects of the present invention are not limited in this respect.

Figure 4:
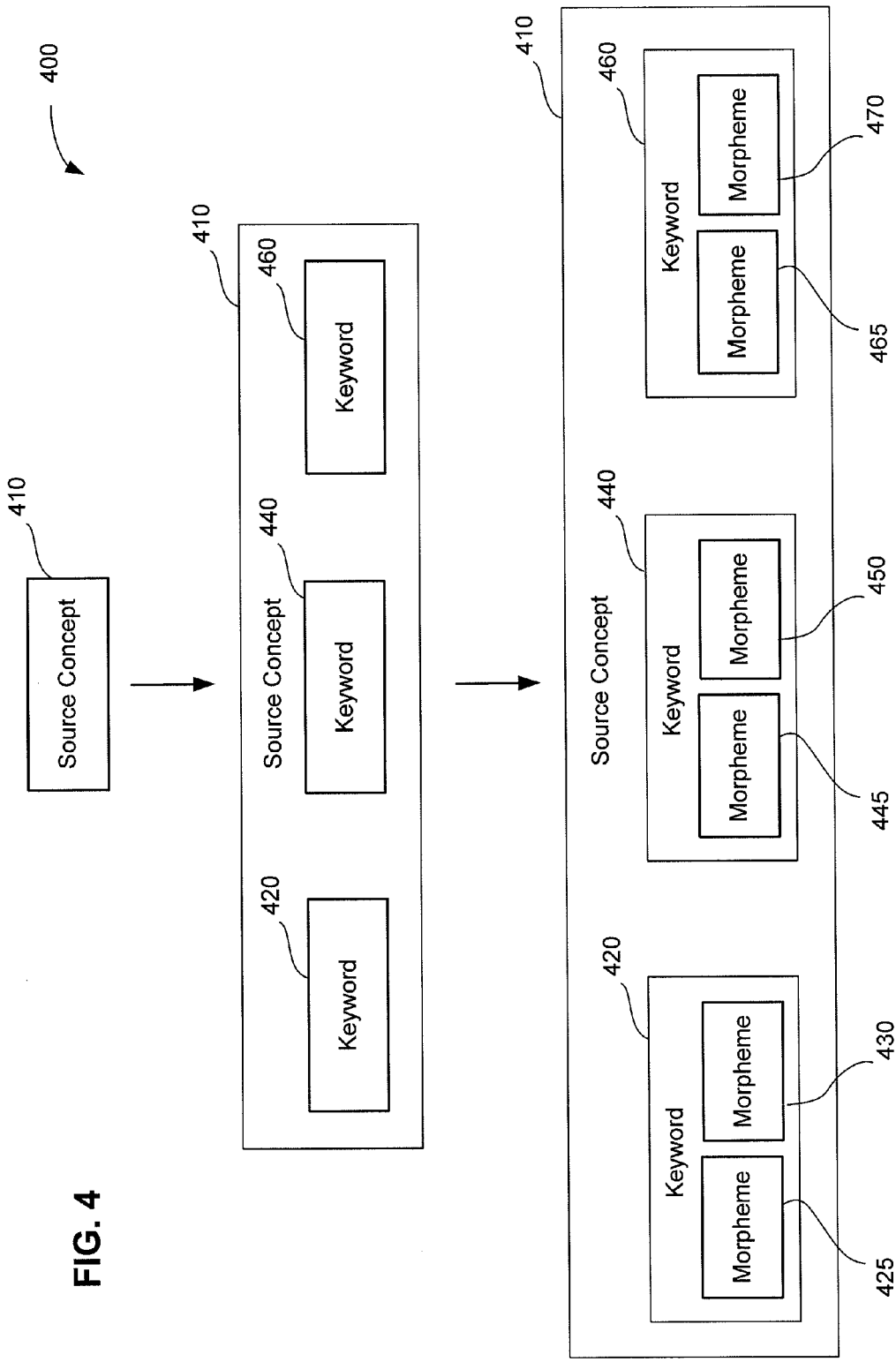
FIG. 4 illustrates an exemplary method for analysis of a complex knowledge representation in accordance with some embodiments of the present invention.

FIG. 4 illustrates one exemplary method 400 of semantic analysis that may be used by analysis engine 150 in deconstructing an input complex KR 160. It should be appreciated that the method illustrated in FIG. 4 is merely one example, and many other methods of analysis are possible, as discussed above, as aspects of the present invention are not limited in this respect. Exemplary method 400 begins with extraction of a source concept 410 with a textual concept label explicitly presented in the source data structure. Multiple source concepts 410 may be extracted from a source data structure, along with source concept relationships between the source concepts 410 that may explicitly present in the source data structure.

A series of keyword delineators may be identified in the concept label for source concept 410. Preliminary keyword ranges may be parsed from the concept label based on common structural textual delineators of keywords (such as parentheses, quotes, and commas). Whole words may then be parsed from the preliminary keyword ranges, again using common word delineators (such as spaces and grammatical symbols). Checks for single word independence may then be performed to ensure that the parsed candidate keywords are valid. In some embodiments, a check for word independence may be based on a method of word stem (or word root) matching, hereafter referred to as "stemming". Once validated, if a word is present in one concept label with other words, and is present in a related concept label absent those other words, than the word may delineate a keyword.

Once a preliminary set of keyword labels is thus generated, all preliminary keyword labels may be examined in the aggregate to identify compound keywords, which present more than one valid keyword label within a single concept label. In some embodiments, recursion may be used to exhaustively split the set of compound keywords into the most elemental set of keywords that is supported by the source data. The process of candidate keyword extraction, validation and splitting may be repeated until no more atomic keywords can be found.

In some embodiments, a final method round of consolidation may be used to disambiguate keyword labels across the entire domain. Such disambiguation may be used to resolve ambiguities that emerge when entities share the same labels. In some embodiments, disambiguation may be provided by consolidating keywords into single structural entities that share the same label. The result may be a set of keyword concepts, each included in a source concept from which it was derived. For example, source concept 410 may be deconstructed into keywords 420, 440 and 460, parsed from its concept label, and keywords 420, 440 and 460 may make up a concept definition for source concept 410. For instance, in the example elemental data structure 300 of FIG. 2B, the more elemental concept 255 labeled "Domestic" may be deconstructed from the more complex concept 250 labeled "Domestic Dog" as a keyword parsed from the concept label.

In some embodiments, concept definitions including keyword concepts may be extended through further deconstruction to include morpheme concept entities in their structure, as a deeper and more fundamental level of abstraction. In some embodiments, morphemes may represent elemental, irreducible attributes of more complex concepts and their relationships. At the morpheme level of abstraction, many of the attributes would not be recognizable to human classificationists as concepts. However, when combined into relational data structures across entire domains, morphemes may in some embodiments be able to carry the semantic meaning of the more complex concepts using less information.

In some embodiments, methods of morpheme extraction may have elements in common with the methods of keyword extraction discussed above. Patterns may be defined to use as criteria for identifying morpheme candidates. These patterns may establish the parameters for stemming, and may include patterns for whole word as well as partial word matching. As with keyword extraction, the sets of source concept relationships may provide the context for morpheme pattern matching. The patterns may be applied against the pool of keywords within the sets of source concept relationships in which the keywords occur. A set of shared roots based on stemming patterns may be identified. The set of shared roots may comprise the set of candidate morpheme roots for each keyword.

In some embodiments, the candidate morpheme roots for each keyword may be compared to ensure that they are mutually consistent. Roots residing within the context of the same keyword and the source concept relationship sets in which the keyword occurs may be assumed to have overlapping roots. Further, it may be assumed that the elemental roots derived from the intersection of those overlapping roots will remain within the parameters used to identify valid morphemes. Such validation may constrain excessive morpheme splitting and provide a contextually meaningful yet fundamental level of abstraction. In some embodiments, any inconsistent candidate morpheme roots may be removed from the keyword sets. The process of pattern matching to identify morpheme candidates may be repeated until all inconsistent candidates are removed.

In some embodiments, by examining the group of potential roots, one or more morpheme delineators may be identified for each keyword. Morphemes may be extracted based on the location of the delineators within each keyword label. Keyword concept definitions may then be constructed by relating (or mapping) the extracted morphemes to the keywords from which they were derived. For example, morpheme concepts 425 and 430 may be included in the concept definition for keyword concept 420, morpheme concepts 445 and 450 may be included in the concept definition for keyword concept 440, and morpheme concepts 465 and 470 may be included in the concept definition for keyword concept 460. Thus, an original source concept 410 may be deconstructed through semantic analysis to the level of keyword concepts, and further to the most elemental level of morpheme concepts for inclusion in an elemental data structure of an AKRM.

It should be appreciated, however, that any suitable level of abstraction may be employed in generating an elemental data structure, and any suitable method of analysis may be used, including methods not centered on keywords or morphemes, as aspects of the present invention are not limited in this respect. In some embodiments, an elemental data structure included in an AKRM for use in analysis and/or synthesis of more complex KRs may include and encode concepts and relationships that are more elemental than concepts and relationships included in the complex KRs deconstructed to populate the elemental data structure and/or synthesized from the elemental data structure. For example, abstract meanings of complex concepts encoded in a complex KR may be formed by combinations of abstract meanings of elemental concepts encoded in the elemental data structure of the AKRM.

In some embodiments, concepts stored in an elemental data structure as part of a centralized AKRM may have been deconstructed from more complex concepts to the level of single whole words, such as keywords. The example of FIG. 2B illustrates such an elemental data structure encoding single whole words. In some embodiments, concepts in the elemental data structure may have been deconstructed to more elemental levels representing portions of words. In some embodiments, concepts in the elemental data structure may have been deconstructed to a more elemental semantic level represented by morphemes, the smallest linguistic unit that can still carry semantic meaning. For example, the whole word concept "Siamese" may be deconstructed to create two morpheme concepts, "Siam" and "-ese", with "Siam" representing a free morpheme and "-ese" representing an affix. In some embodiments, an elemental data structure of an AKRM may include only concepts at a specified level of elementality; for example, an elemental data structure may in some embodiments be formed completely of morphemes or completely of single word concepts. In other embodiments, an elemental data structure may include concepts at various different levels of elementality (e.g., including morpheme concepts, keyword concepts and/or other concepts at other levels of elementality), with at least some of the concepts in the elemental data structure being more elemental than the complex concepts in input KRs they are deconstructed from and/or the complex concepts in output KRs that they create in combination with other elemental concepts. It should be appreciated that any suitable basis for deconstructing complex KRs into more elemental data structures may be utilized, including bases tied to paradigms other than linguistics and semantics, as aspects of the present invention are not limited in this respect.

Returning to FIG. 1, data consumer 195 may represent one or more human users of system 100 and/or one or more machine-implemented software applications interacting with system 100. In some embodiments, data consumer 195 may make requests and/or receive output from system 100 through various forms of data. For example, a data consumer 195 may input a complex KR 160 to system 100 to be deconstructed to elemental concepts and concept relationships to generate and/or update elemental data structure 120. A data consumer 195 (the same or a different data consumer) may also receive an output complex KR 190 from system 100, synthesized by application of one or more of the knowledge processing rules 130 to part or all of elemental data structure 120.

In some embodiments, data consumer 195 also may provide a context 180 for directing synthesis and analysis operations. For example, by inputting a particular context 180 along with a request for an output KR, data consumer 195 may direct system 100 to generate an output KR 190 with appropriate characteristics for the information required or the current task being performed by the data consumer. For example, a particular context 180 may be input by data consumer 195 as a search term mappable to a particular concept about which data consumer 195 requires or would like to receive related information. Synthesis engine 170 may, for example, apply rules 130 to only those portions of elemental data structure 120 that are conceptually related (i.e., connected in the data structure) to the concept corresponding to the context 180. In another example, an input context 180 may indicate a particular type of knowledge representation model with which data consumer 195 would like output KR 190 to conform, such as a taxonomy. Accordingly, synthesis engine 170 may apply only those rules of the set of rules 130 that are appropriate for synthesizing a taxonomy from elemental data structure 120.

It should be appreciated that input context 180 may include any number of requests and/or limitations applying to the synthesis of output KR 190, and components of input context 180 may be of any suitable type encoded in any suitable form of data or programming language, as aspects of the present invention are not limited in this respect. Examples of suitable input contexts include, but are not limited to, free text queries and submissions, e.g., mediated by a natural language processing (NLP) technology, and structural inputs such as sets of terms or tags, consistent with various Web 2.0 systems. In some embodiments, generating output KR 190 in accordance with a particular context 180 may enable a more fluid and dynamic interchange of knowledge with data consumers. However, it should be appreciated that an input context 180 is not required, and system 100 may produce output KRs 190 without need of input contexts in some embodiments, as aspects of the present invention are not limited in this respect.

Data consumers 195 may also provide input KRs 160 of any suitable type to system 100 in any suitable form using any suitable data encoding and/or programming language, as aspects of the present invention are not limited in this respect. Examples of suitable forms of input KRs include, but are not limited to, semi-structured or unstructured documents, again used with various forms of NLP and text analytics, and structured knowledge representations such as taxonomies, controlled vocabularies, faceted classifications and ontologies.

Figure 5:
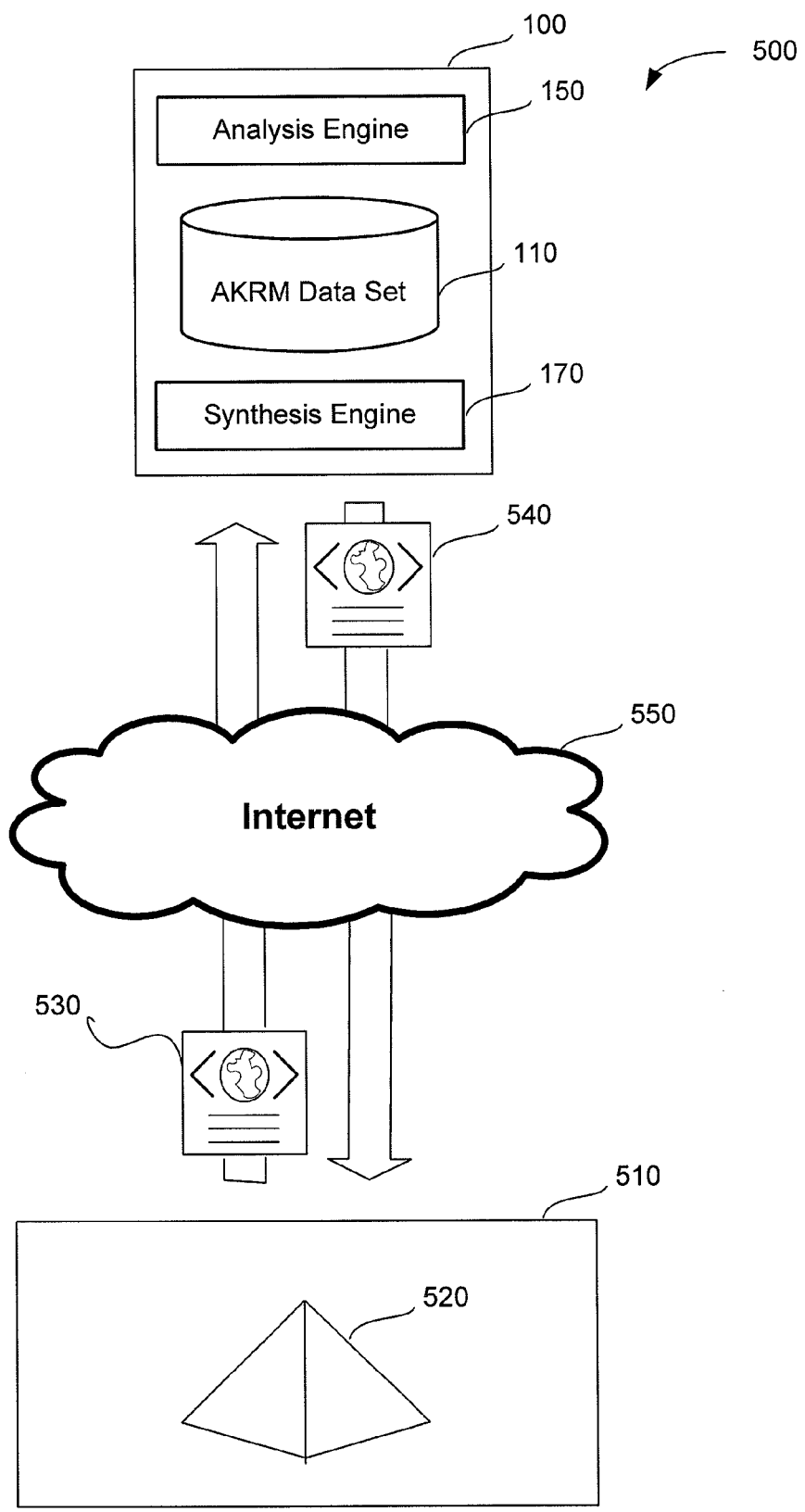
FIG. 5 is a block diagram illustrating an exemplary distributed system for implementing analysis and synthesis of complex knowledge representations in accordance with some embodiments of the present invention.

In some embodiments in accordance with the present disclosure, a system for analysis and synthesis of complex KRs using an AKRM, such as system 100, may be implemented on a server side of a distributed computing system with network communication with one or more client devices, machines and/or computers. FIG. 5 illustrates such a distributed computing environment 500, in which system 100 may operate as a server-side transformation engine for KR data structures. The transformation engine may take as input one or more source complex KR data structures 520 provided from one or more domains by a client 510, e.g., through actions of a human user or software application of client 510. In some embodiments, the input complex KR 520 may be encoded into one or more XML files 530 that may be distributed via web services (or API or other distribution channels) over a network such as the Internet 550 to the computing system(s) on which system 100 is implemented. Similarly, system 100 may return requested output KRs to various clients 510 through the network as XML files 540. However, it should be appreciated that data may be communicated between server system 100 and client systems 510 in any suitable way and in any suitable form, as aspects of the present invention are not limited in this respect.

Through this and/or other modes of distribution and decentralization, in some embodiments a wide range of developers and/or publishers may use the analysis engine 150 and synthesis engine 170 to deconstruct and create complex KR data structures. Exemplary applications include, but are not limited to, web sites, knowledge bases, e-commerce stores, search services, client software, management information systems, analytics, etc.

In some embodiments, an advantage of such a distributed system may be clear separation of private domain data and shared data used by the system to process domains. Data separation may facilitate hosted processing models, such as a software-as-a-service (SaaS) model, whereby a third party may offer transformation engine services to domain owners. A domain owner's domain-specific data may be hosted by the SaaS securely, as it is separable from the shared data (e.g., AKRM data set 110) and the private data of other domain owners. Alternately, the domain-specific data may be hosted by the domain owners, physically removed from the shared data. In some embodiments, domain owners may build on the shared knowledge (e.g., the AKRM) of an entire community of users, without having to compromise their unique knowledge.

Figure 6:
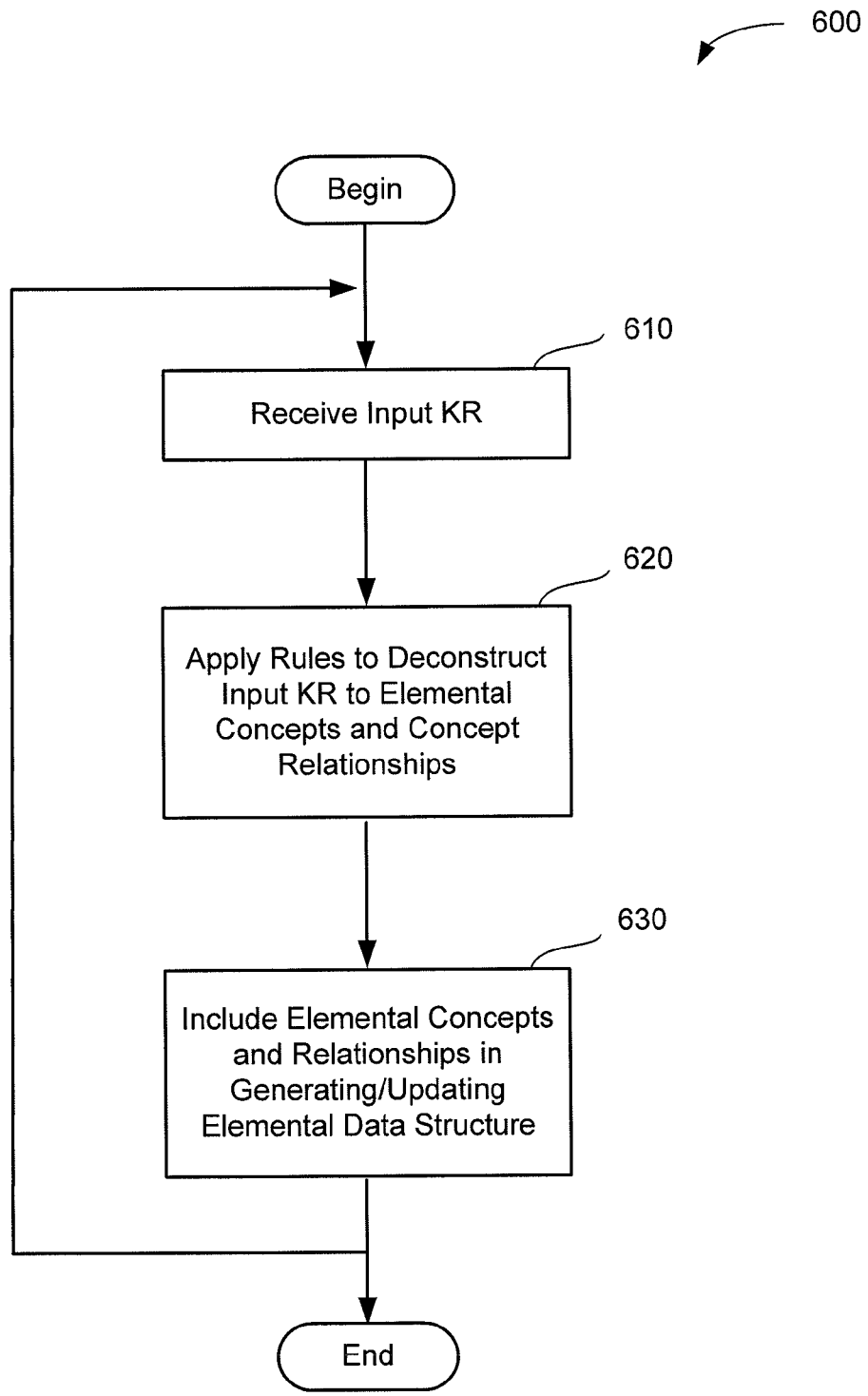
FIG. 6 is a flowchart illustrating an exemplary method for analyzing complex knowledge representations to generate an elemental data structure in accordance with some embodiments of the present invention.

As should be appreciated from the foregoing discussion, some embodiments in accordance with the present disclosure are directed to techniques of analyzing an original complex knowledge representation to deconstruct the complex KR and generate or update an elemental data structure of an atomic knowledge representation model. FIG. 6 illustrates one such technique as exemplary process 600. Process 600 begins at act 610, at which an input complex KR may be received, for example from a data consumer by an analysis/synthesis system such as system 100.

At act 620, one or more knowledge processing rules encoded in system 100 as part of an AKRM may be applied to deconstruct the input complex KR to one or more elemental concepts and/or one or more elemental concept relationships. Examples of knowledge processing rules applicable to various types of input KRs are provided below. However, it should be appreciated that aspects of the present invention are not limited to any particular examples of knowledge processing rules, and any suitable rules encoded in association with an atomic knowledge representation model may be utilized. As discussed above, such rules may be provided at any suitable time by a developer of the analysis system and/or by one or more end users of the analysis system.

At act 630, one or more of the elemental concepts and/or elemental concept relationships discovered and/or derived in act 620 may be included in an elemental data structure encoded and stored as part of the AKRM of the system. In some embodiments, some or all of the elemental concepts and relationships derived from a single input complex KR may be used to populate a new elemental data structure of an AKRM. In some embodiments, when a stored elemental data structure has already been populated, new elemental concepts and/or relationships discovered from subsequent input KRs may be included in the stored elemental data structure to update and/or extend the centralized AKRM. In some embodiments, process 600 may continue to loop back to the beginning to further update a stored elemental data structure and/or generate new elemental data structures as new input KRs become available. In other embodiments, process 600 may end after one pass or another predetermined number of passes through the process, after a stored elemental data structure has reached a predetermined size or complexity, or after any other suitable stopping criteria are met.

Figure 7:
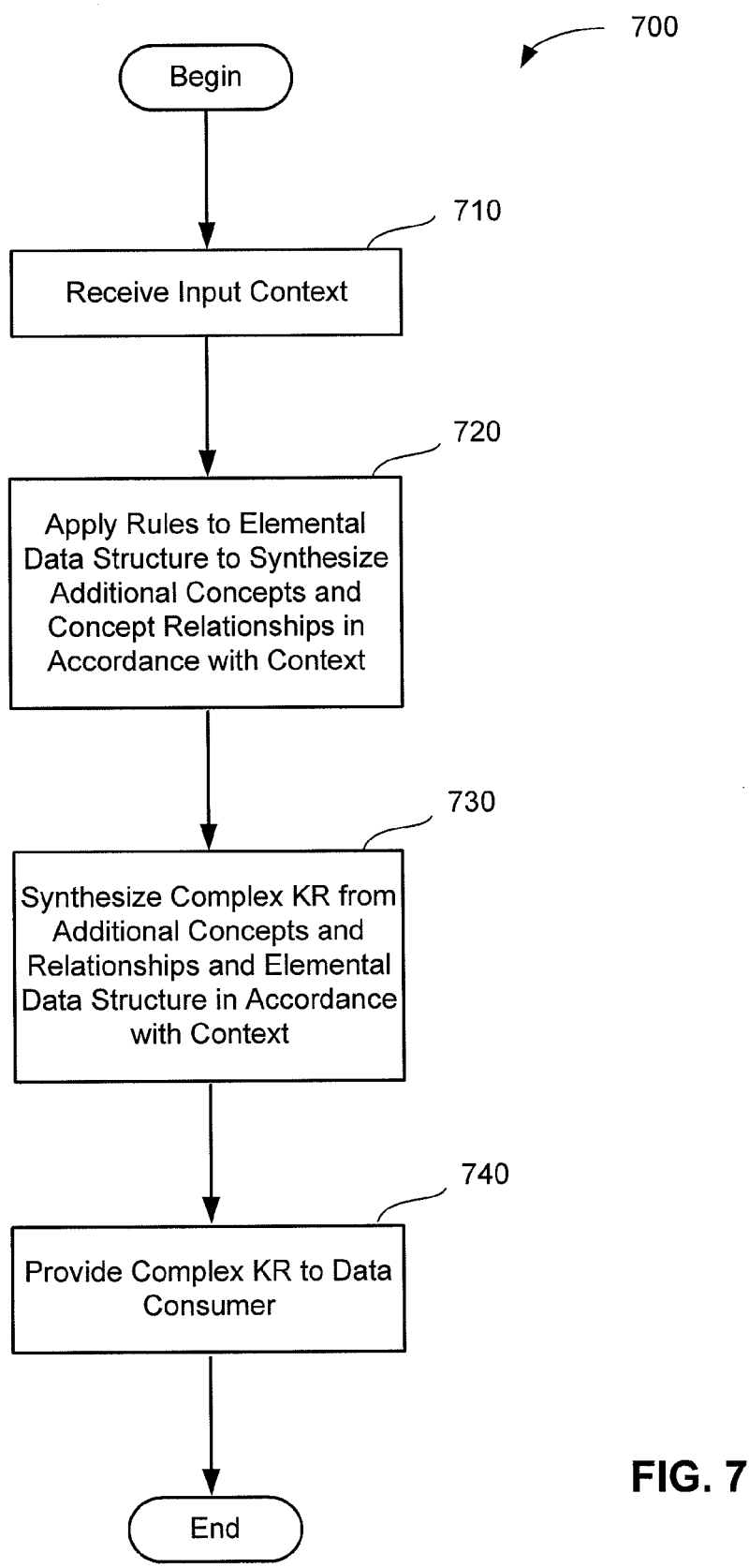
FIG. 7 is a flowchart illustrating an exemplary method for synthesizing complex knowledge representations from an elemental data structure in accordance with some embodiments of the present invention.

As should be appreciated from the foregoing discussion, some further embodiments in accordance with the present disclosure are directed to techniques for generating (synthesizing) complex knowledge representations using an atomic knowledge representation model. FIG. 7 illustrates such a technique as exemplary process 700. Process 700 begins at act 710, at which an input context may be received, for example from a data consumer such as a human user or a software application. As discussed above, such a context may include a textual query or request, one or more search terms, identification of one or more seed concepts, etc. In addition, the context may indicate a request for a particular form of complex KR. In some embodiments, however, a request for a complex KR may be received without further context to limit the concepts and/or concept relationships to be included in the complex KR, as aspects of the present invention are not limited in this respect. Furthermore, in some embodiments, receipt of a context may be interpreted as a request for a complex KR, without need for an explicit request to accompany the context.

At act 720, in response to the input request and/or context, one or more appropriate knowledge processing rules encoded in the AKRM may be applied to the elemental data structure of the AKRM to synthesize one or more additional concepts and/or concept relationships not explicitly encoded in the elemental data structure. Examples of knowledge processing rules applicable to synthesizing various types of output KRs are provided below. As discussed above, in some embodiments rules may be applied bi-directionally to accomplish both analysis and synthesis of complex KRs using the same knowledge processing rules, while in other embodiments one set of rules may be applied to analysis and a different set of rules may be applied to synthesis. However, it should be appreciated that aspects of the present invention are not limited to any particular examples of knowledge processing rules, and any suitable rules encoded in association with an atomic knowledge representation model may be utilized. As discussed above, such rules may be provided at any suitable time by a developer of the analysis system and/or by one or more end users of the analysis system.

In some embodiments, appropriate rules may be applied to appropriate portions of the elemental data structure in accordance with the received input request and/or context. For example, if the input request specifies a particular type of complex KR to be output, in some embodiments only those rules encoded in the AKRM that apply to synthesizing that type of complex KR may be applied to the elemental data structure. In some embodiments, if no particular type of complex KR is specified, a default type of complex KR, such as a taxonomy, may be synthesized, or a random type of complex KR may be selected, etc. If the input context specifies one or more particular seed concepts of interest, for example, only those portions of the elemental data structure related (i.e., connected through concept relationships) to those seed concepts may be selected and the rules applied to them to synthesize the new complex KR. In some embodiments, some predetermined limit on the size and/or complexity of the output complex KR may be set, e.g., by a developer of the synthesis system or by an end user, for example conditioned on a number of concepts included, hierarchical distance between the seed concepts and selected related concepts in the elemental data structure, encoded data size of the resulting output complex KR, processing requirements, etc.

At act 730, a new complex KR may be synthesized from the additional concepts and relationships synthesized in act 720 and the selected appropriate portions of the elemental data structure, and encoded in accordance with any specified type of KR indicated in the received input. At act 740, the resulting synthesized complex KR may be provided to the data consumer from which the request was received. As discussed above, this may be a software application or a human user who may view and/or utilize the provided complex KR through a software user interface, for example. Process 700 may then end with the provision of the newly synthesized complex KR encoding new knowledge.

The following sections of pseudo-code may serve as further illustration of the above-described methods.

```
KnowledgeCreation(KR_in, RULES_in, CONTEXT, ANALYSIS,
SYNTHESIS)
Input:
-   CONTEXT: User/Application Context (e.g., requests, seed
    concepts, domain restrictions)
-   KR_in: Knowledge representation (e.g., taxonomy)
-   RULES: Relevant Knowledge Processing Rules
-   ANALYSIS: a flag for enabling Analysis event
-   SYNTHESIS: a flag for enabling Synthesis event
Output:
-   Concepts and relationships to be stored in AKRM
-   Complex KR_out to present to user/applications
Procedure:
    C_a = AKRM.C      /*a set concepts definitions defined in the
                        AKRM*/
    R_a = AKRM.R      /* a set of concept relationships defined in
                        the AKRM*/
    C = { }           /* a set of new concept definitions*/
    R = { }           /* a set of new relationships*/
    KR_out = C + R    /* a complex knowledge representation */
```

-continued

```
/* keep performing analysis tasks as long as more rules can be
applied*/
whenever (ANALYSIS) do {
    Apply an analysis rule from RULES to the KRin + C_a + R_a
    C_a = C_a U {set of generated atomic concepts}
    R_a = R_a U {set of generated relationships}
    If no more rules can be applied set ANALYSIS to false
}
/* keep performing synthesis tasks as long as more rules can be
applied*/
whenever (SYNTHESIS} do {
    Apply a synthesis rule from RULES to C_a + C + R_a + R +
    CONTEXT
    C = C U {set of generated complex concepts}
    R = R U {set of generated complex relationships}
    If no more rules can be applied set SYNTHESIS to false
    /*Possibly materialize a subset of generated KR*/
    if (enough support or user request)
        C_a = C_a U C and R_a = R_a U R
}
/*present the generated complex KR to user/applications*/
output complex KR_out = C + R (to user/application)
```

As should be appreciated from the foregoing discussion, some embodiments in accordance with the present disclosure are directed to techniques for supporting semantic interoperability between knowledge representations using an atomic knowledge representation model. As discussed above, maintaining a shared centralized AKRM with a stored elemental data structure in some embodiments may allow multiple different input complex KRs (in some cases of different types or knowledge representation models) to be deconstructed to elemental concepts and/or concept relationships used in the generating and/or updating of a single shared elemental data structure that is semantically compatible with all types of complex KRs. In addition, through deconstruction to an elemental data structure and subsequent synthesis to a new complex KR, an input KR of one type may in some embodiments be transformed to an output KR of a different type based on the same source data.

The following pseudo-code may serve as a further illustration of methods of integrating multiple different KRs under the AKRM described herein, to provide benefits of semantic interoperability.

```
Input:
-   KR_1, KR_2,...,KR_n: /*n possible different KR*/
-   RULES_1, RULES_2,...,RULES_n /* Relevant Knowledge Processing
    Rules*/
-   User/application context
Output:
-   Concepts and relationships to be stored in AKRM
-   Complex KR to present to user/applications
Procedure:
    C_a = AKRM.C       /*a set concepts definitions defined in the
                       AKRM*/
    R_a = AKRM.R       /* a set of concept relationships defined in
                       the AKRM*/
    C = { }            /* a set of new concept definitions*/
    R = { }            /* a set of new relationships*/
    KR_out = C + R     /* a complex knowledge representation */
    /* Analyze the input KRs and populate AKRM */
    for (i : 1 to n){
        Apply all possible analysis rules from RULES_i to the KR_i
        + C_a + R_a
        C_a = C_a U {set of generated atomic concepts}
        R_a = R_a U {set of generated relationships}
    }
    /* Synthesize new knowledge */
    Apply possible synthesis rules from RULES_i to C_a + C + R_a + R
    C = C U {set of generated complex concepts}
    R = R U {set of generated complex relationships}
```

-continued

```
/*Possibly materialize a subset of generated KR*/
C_a = C_a U C and R_a = R_a U R
```

FIG. 8 provides a table illustrating six exemplary knowledge processing rules that may be used in some embodiments in accordance with the present disclosure in analysis and/or synthesis of five exemplary types of complex knowledge representations (i.e., taxonomies, synonym rings, thesauri, faceted classifications and ontologies). However, as discussed above, it should be appreciated that these examples are provided merely for purposes of illustration, and aspects of the present invention are not limited to any particular set of rules or KR types or models. In addition, in some embodiments an analysis/synthesis system may be seeded with an initial set of knowledge processing rules, for example by a developer of the system, which may be expanded with additional rules and/or updated with changed and/or deleted rules at later times, for example by end users of the system. Different sets of rules applicable to different types of KRs may also be stored for different end users or applications, for example in user accounts. Further, in some embodiments knowledge processing rules may be reused and combined in novel ways to address the requirements for specific KRs.

The exemplary rules presented in FIG. 8 are discussed below with reference to specific examples involving the exemplary KR types provided in the figure. It should be appreciated that any of the generalized methods described above may be applied to any of the following examples, with differing inputs, outputs and knowledge processing rules being involved. It should also be appreciated that, although many different aspects of a knowledge creation theory may be modeled through the exemplary rules discussed herein, various other types of rules are possible. The examples that follow are largely driven by the topology of the knowledge representation data structures. Other bases for rules may include linguistic morphology and syntax, phonology, metaphor, symbolism, and sensory perception, among others.

In some embodiments, encoding a set of knowledge processing rules such as the exemplary rules given in FIG. 8 within an atomic knowledge representation model may allow for analyzing and/or synthesizing any complex KR within a set of supported KR types, such as those represented in FIG. 8. In the example of FIG. 8, "X" marks show which rules of the exemplary set of six rules apply to which KR types of the exemplary set of five KR types. In these examples, each rule may be applied bi-directionally in analysis or synthesis of complex KRs of types to which it applies. For instance, given an input thesaurus KR, FIG. 8 makes clear that rules 1, 2, 3 and 4 may be applied to the input thesaurus to deconstruct it to elemental concepts and concept relationships to be included in the elemental data structure. In another example, applying rules 1, 2 and 3 to an elemental data structure results in an output synonym ring KR. The use of each of these exemplary rules to perform analysis and/or synthesis of appropriate complex KRs is described below with reference to examples.

Taxonomy Rules

The following inputs/outputs and knowledge processing rules provide features of a taxonomy, as a hierarchical classification of concepts.

Input/Output:
A set of concepts C
A set of hierarchical relationships (acyclic)

$$R = \{r(c_i, c_j) : c_i, c_j \in C \text{ and } c_i \text{ Is-a } c_j\}$$

Definition 1 (Coherent Concepts): Two concepts $c_i, c_j$ are considered coherent if according to some distance metric M, $M(c_i,c_j)<T$, where T is a pre-chosen threshold. Possible metrics include: frequency of co-occurrence of the two concepts in an input corpus, or a tree distance function applied on the taxonomy hierarchy.

Rule 1 (Coherent Concepts Synthesis): Create a new concept $c=\{c_i,c_j\}$. c is said to be comprised of $c_i$ and $c_j$ if and only if $c_i$ and $c_j$ are coherent with respect to Definition 1.

Rule 2 (Hierarchical Relationship Synthesis): Let $c_1=\{c_{11}, c_{22}, \ldots c_{1n}\}$ be a concept comprised of n concepts, $c_{11}$ to $C_{1n}$. Similarly, let $c_2=\{c_{21}, c_{22}, \ldots c_{2m}\}$ be a concept comprised of m concepts, $c_{21}$ to $c_{2m}$. Create a new hierarchical relationship $r(c_1,c_2)$ if and only if for each $c_{1i}$ there exists a relationship $r(c_{1i},c_{2j})$ for some concept $c_{2j}$.

Note that the if-and-only-if part of each of the exemplary Rules (e.g., Rule 1 and Rule 2) reflects the bi-directional analysis/synthesis nature of the rule. For example, Analysis will enforce the "if" part (forcing an explicit hierarchical relationship to be presented in the AKRM to satisfy the condition). On the other hand, Synthesis will discover the "only-if" part (discover hierarchical relationships if the conditions apply).

An example of application of these exemplary rules to analyze and deconstruct an input taxonomy 200 to a more elemental data structure 300 has been given in FIGS. 2A and 2B. In the example, complex concepts 230, 250 and 270 are deconstructed to generate new more elemental concepts 235, 240, 255, 260, 275 and 280 through application of Rule 1, and their relationships through application of Rule 2. In addition, new complex concepts may be synthesized through application of Rule 1 using (for example) external corpora as evidence: {domestic, lion}, {mountain, dog}, {mountain, cat}, {domestic, goat}, {domestic, pet}, {domestic, cat}. Application of Rule 2 in synthesis may generate new concept relationships; for example, because hierarchical relationships exist between "Animal" and "Dog" and between "Animal" and "Mountain", a new hierarchical relationship between "Animal" and "Mountain Dog" may be synthesized.

Synonym Ring Rules

The following inputs/outputs and knowledge processing rules provide features of a synonym ring, as defined by the proximity of meaning across terms or concepts, or in logic, the inner substitutability of terms that preserve the truth value.

Input/Output:
A set of concepts C (possibly with "comprised of" relationships)
Lists of synonyms: Synonym($c_i,c_j$)

Definition 2 (Semantic Similarity): Let $c_1=\{c_{11},c_{22}, \ldots c_{1n}\}$ be a concept comprised of n concepts, $c_{11}$ to $c_{1n}$. Similarly, let $c_2=\{c_{21},c_{22}, \ldots c_{2m}\}$. A similarity function S, $S(c_1,c_2)$, describes the semantic similarity between two concepts. An example function is as follows:

$$S(c_1, c_2) = \sum_{i,j} S(c_1, c_2 \mid c_i, c_j)$$

$$S(c_1, c_2 \mid c_i, c_j) = \begin{cases} 1 & \text{if Synonym}(c_i, c_j) \\ 1 & \text{if } c_i = c_j \\ 1 & \text{if } \exists c_k \mid r(c_i, c_k) \wedge r(c_j, c_k) \\ 0 & \text{otherwise} \end{cases}$$

Definition 3 (Concept Intersection): Let $c_1=\{c_{11},c_{22}, \ldots c_{1n}\}$ be a concept comprised of n concepts, $c_{11}$ to $c_{1n}$. Similarly, let $c_2=\{c_{21},c_{22}, \ldots c_{2m}\}$.

$$c_1 \cap c_2 = \left\{ c_l \mid \forall c_i \in c_1 \wedge c_j \in c_2, \begin{array}{l} c_l = c_i \text{ if } c_i = c_j \vee r(c_j, c_i) \\ c_l = c_j \text{ if } r(c_i, c_j) \\ c_l = c_k \text{ if } \exists c_k \mid r(c_i, c_k) \wedge r(c_j, c_k) \end{array} \right\}$$

Rule 3 (Synonym Concepts Synthesis): Let $c_1=\{c_{11}, c_{22}, \ldots c_{1n}\}$ and $c_2=\{c_{21},c_{22}, \ldots c_{2m}\}$ be two synonym concepts according to Definition 2. A concept $c_3=c_1 \cap c_2$ and the hierarchical relationships $r(c_1,c_3)$ and $r(c_2,c_3)$ exist if and only if $S(c_1,c_2)>T_{synonym}$, where $T_{synonym}$ is a threshold of semantic similarity that warrants the declaring of "synonyms":

$$\text{Synonym}::=c_3=c_1 \cap c_2 \neq \phi \wedge r(c_1,c_3) \wedge r(c_2,c_3)$$

$$S(c_1,c_2)>T_{synonym}$$

An example of a synonym ring is as follows:
Pet: Domestic Animal: Household Beast: Cat Analysis according to Rule 3 may derive hierarchical relationships through which all four concepts are children of "Household Animal". Analysis according to Rule 1 may derive the following new concepts:

House, Domestic, Household, Animal, Beast, Mammal

Analysis according to Rule 2 may discover hierarchies in which "Domestic" and "Household" are children of "House", and "Pet", "Mammal", "Beast" and "Cat" are children of "Animal". These hierarchical relationships may be created based on the relationships between the complex concepts from which the simpler concepts were extracted. Accordingly, the following new synonym rings may be synthesized through application of Rule 3:

Cat: Pet: Mammal: Beast
Domestic: Household

Thesaurus Rules

The following inputs/outputs and knowledge processing rules provide features of a thesaurus, including features of the KRs described above as well as associative relationships (related terms).

Input/Output:
A set of concepts C (possibly with "comprised of" relationships)
List of Associative relationships, e.g., Synonym($c_i,c_j$), RelatedTerm($c_i,c_j$)
A set of hierarchical relationships (acyclic) $R=\{r(c_i,c_j): c_i, c_j \in C$ and $c_i$ NT $c_j\}$ Rule 1 (Coherent Concepts Synthesis) applies to thesauri.
Rule 2 (Hierarchical Relationship Synthesis) applies to thesauri.

Rule 4 (Associative Relationship Synthesis): Let $c_1=\{c_{11}, c_{22}, \ldots c_{1n}\}$ and $c_2=\{c_{21},c_{22}, \ldots c_{2m}\}$ be two related concepts according to some associative relationship AR. A concept $c_3=c_1 \cap c_2$, $c_4=\{AR\}$ and the three hierarchical relationships $r(c_1,c_3)$, $r(c_2,c_3)$ and $r(c_4,c_3)$ exist if and only if $S(c_1,c_2)>T_{AR}$, where $T_{AR}$ is a threshold of semantic similarity that warrants the declaring of an "AR" relationship between the two concepts:

$$\text{Associative Relation AR}::=c_4=\{AR\}, c_3=c_1 \cap c_2 \neq \phi, r(c_1,c_3), r(c_2,c_3)$$

$$S(c_1,c_2)>T_{AR}$$

Note that $T_{AR}$ might be set to zero if no semantic similarity is required and association via $c_3$ is enough to capture the relationship.

An example thesaurus may include the associative relationship: {Cat, Diet} is-associated-with {Fish, Food}. Analysis according to Rule 1 may derive the following new concepts:

Cat, Diet, Fish, Food

Given the appropriate patterns in the hierarchical relationships presented, new associative relationships may be synthesized through application of Rule 4, for example "Cat" is-associated-with "Fish" and "Diet" is-associated-with "Food". Again, the associative relationships may be created based on the relationships between the complex concepts from which the simpler concepts were extracted.

Faceted Classification Rules

The following inputs/outputs and knowledge processing rules provide features of a faceted classification, including facets and facet attributes as concepts, and facets as categories of concepts organized in class hierarchies. Additionally, the following examples add features of mutually exclusive facet hierarchies (facet attributes constrained as strict/mono hierarchies, single inheritance) and the assignment of facet attributes to the objects (or nodes) to be classified as sets of concepts. Further, facets are identified topologically as the root nodes in the facet hierarchies.

Input/Output:

Facet hierarchies (hierarchy of value nodes for each root facet)

Labeled terms/concepts with respect to facet values

Definition 4 (Mutually Exclusive Facet Hierarchies): Any concept can be classified by picking one and only one node label/value/attribute from each facet hierarchy. That is, the semantics of concepts representing nodes in any facet hierarchy do not overlap.

Rules 1, 2 and 4 apply to facet classification.

Rule 5 (Facet Attribute Assignments): Each node/value/attribute in a facet hierarchy corresponds to a concept c. A relation $r(c_i,c_j)$ exists if and only if $c_i$ appears as a child of only one parent $c_j$ in some facet hierarchy and if for any two concepts $c_1$, $c_2$ in a facet hierarchy, $C_1 \cap c_2 = \{\ \}$.

Rule 6 (Labeled Concept Assignments): Each labeled term in the faceted classification corresponds to a concept $c_i = \{c_{i1}, c_{i2}, \ldots c_{in}\}$, where $c_{ij}$ is a label concept according to Rule 5.

An example input faceted classification is as follows:

Facet: Domestication
- Domesticated
- Wild
Facet: Species
- Animals
  - Canine
    - Dog
  - Feline
    - Cat
    - Lion
  - Primate
    - Chimpanzee
Facet: Habitat
- Natural
  - Mountain
  - Jungle
  - Desert
  - Savanna
  - Ocean
- Man-made
  - City
  - Farm
Facet: Region
- World
  - Africa
  - Asia
  - Europe
  - Americas
    - North America
      - US
      - Canada
    - South America
Objects with assignments of facet attributes/nodes/values
  "Domestic dog" {North America, Domesticated, Dog}
  "Mountain lion" {Americas, Wild, Cat, Mountain}
  "Siamese Cat" {World, Domesticated, Cat}
  "Lion" {Africa, Wild, Lion, Savanna}

As illustrated in the examples above, analysis according to Rules 2 and 5 may be used to decompose the input faceted classification into a broader facet hierarchy (using, for example, methods of facet analysis or statistical clustering).

Facet: "Pets"/*Synthetic label*/
  "common pet"/*derived from cluster {domesticated, animals}*/
  "exotic pet"/*derived from cluster {wild, animals}*/

Since "Dog" and "Cat" are both "Animals" (derived from the facet hierarchy, "Animals"), the new concept, "Domesticated, Animals", may be found coherent as evident in the sets, "Domesticated, Dog", "Domesticated, Cat", etc.

Similarly, new objects with assignments of facet attributes/nodes/values may be created according to Rules 1 and 6. For example, using the rules for concept synthesis described above, new concepts could also be synthesized, such as "Lion Pet" {Man-made, Lion, domesticated}. Although this might not exist in real-life, it can be justified as possible new knowledge given the evidence in the input KR, and assessed later through (for example) user interactions with the data.

Ontology Rules

Rules 1, 2, 4, 5 and 6 apply to provide features of an ontology, including facets and facet attributes as concepts, and facets as categories of concepts organized in class hierarchies.

Consider the example complex relationship Cohabitate (COH):

Wild Cat←COH→Lion

Domestic Dog←COH→Domestic Cat

Analyzing COH relationships may break them down to more atomic relationships and concepts. The following atomic constructs are possibilities:

Wild Cat, Lion, Domestic Dog, Domestic Cat, Co-habitat

The above-described rules for knowledge creation may be applicable in a complex way to represent richer relationships, e.g., $C_1$ Relation $c_2$, where Relation is a general associative relationship. For complex relationships that are associative relationships (bi-directional), the property of intersection of meanings between the concepts that are paired in the relationship may be leveraged. For complex relationships that are hierarchical (uni-directional), the property of subsumption of meanings between the concepts that are paired in the relationship may be leveraged. The label derived for synthesized complex relationships can conform to a conventional presentation, e.g., "C1 and C2 are related because they have C3 in common."

Applying Rule 1 (Coherent Concepts Synthesis) and Rule 4 (Associative Relationship Synthesis) may result in the following more atomic concepts:

Wild, Cat, Dog, Domestic, Habitat, Wild Habitat, Domestic Habitat, "Wild Habitat" is-a Habitat, "Domestic Habitat" is-a Habitat Synthesis might construct the following concepts and relationships if found coherent:

"Wild Dog" is-comprised-of {Wild, Dog, Wild Habitat}

Hence the following higher order relationships can be deduced:

Wild Dog←COH→Lion
Wild Dog←COH→Wild Cat

Here, both "Wild Dog" and the relationships with "Lion" and "Wild Cat" are newly synthesized constructs.

Free Text (Natural Language) Example

The following is an example of natural language text that may be transformed into a structured semantic representation using approaches such as natural language processing, entity extraction and statistical clustering. Once transformed, the exemplary rules described above may be applied to process the data.

The cat (Felis silvestris catus), also known as the domestic cat or housecat to distinguish it from other felines and felids, is a small carnivorous mammal that is valued by humans for its companionship and its ability to hunt vermin and household pests. Cats have been associated with humans for at least 9,500 years, and are currently the most popular pet in the world. Due to their close association with humans, cats are now found almost everywhere on Earth.

Figure 9:
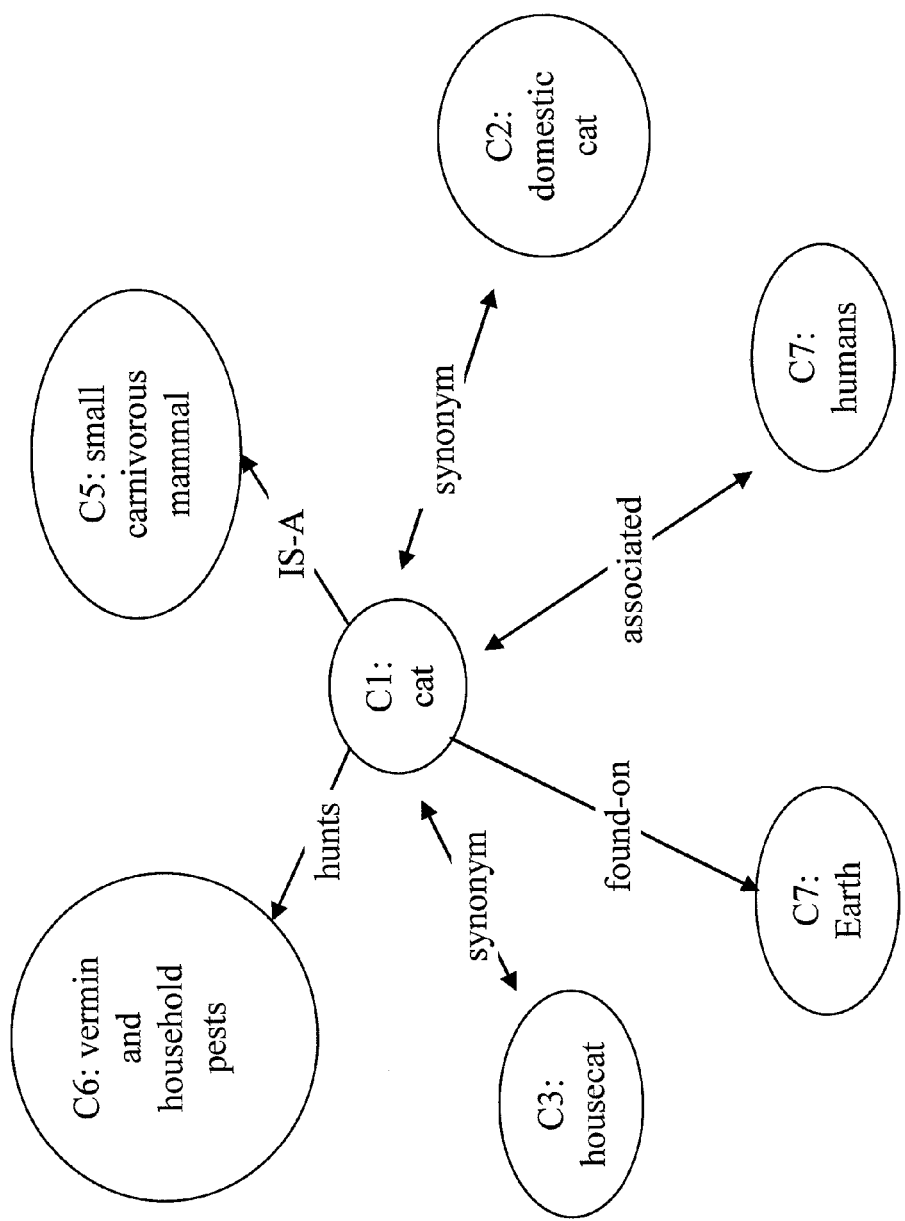
FIG. 9 illustrates an example of a knowledge representation that may be derived from an exemplary natural language text.

A structured knowledge representation as illustrated in FIG. 9 may be derived from this natural language text. This knowledge representation may be processed using the rules described under each illustrative knowledge representation type, as follows:

Taxonomy: C1 is-a C5 (hierarchy)
Synonym Ring: C1:C2:C3
Thesaurus: C1 is-associated-with C7
Ontology: C1 hunts C6; C1 is-found-on C7

Applying synthesis to this example, additional structured data may be derived. For example, applying Rule 1 (Coherent Concepts Synthesis), additional concepts may be derived:

C8: domestic
C9: house

New relationships may then be synthesized, for example by application of Rule 3 (Synonym Concepts Synthesis):

C8::C9 ("domestic" is a synonym of "house")

Semantic Interoperability Example

The following example illustrates semantic interoperability, where an input in one KR may be transformed into a different KR as output. The exemplary processing described below may be implemented, for example, in accordance with the general data flow of the pseudo-code presented above for semantic interoperability processing.

---

Input (The input KR is a thesaurus; :: stands for synonym-of; |- stands for narrower.)
    finch :: sparrow :: chickadee
    bird :: woodpecker :: finch
    woodpecker
        |- red-headed woodpecker
        |- black-backed woodpecker
    sparrow
        |- golden-crowned sparrow
    color
        |- red
        |- black
        |- gold
    anatomy
        |- back
        |- head
            |- cap

---

Figure 10:
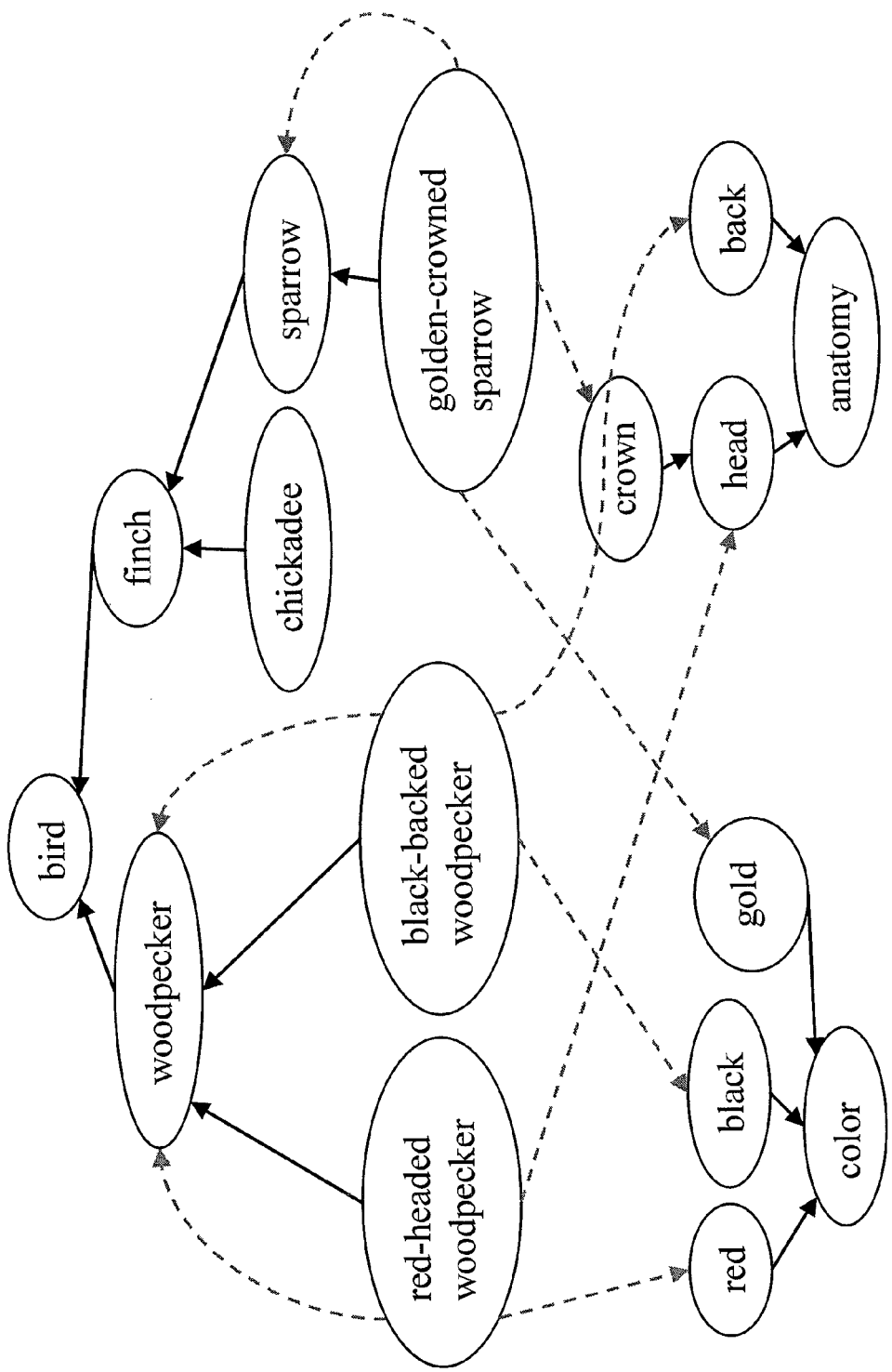
FIG. 10 illustrates an example of an elemental data structure that may be analyzed from an exemplary thesaurus.

An elemental data structure that may be analyzed from the above input KR is illustrated in FIG. 10. In the figure, solid arrows denote "is-a" relationships, and dashed arrows denote "comprised-of" relationships.

---

Output (The output KR is a facet hierarchy of the concept "red-headed woodpecker".)
    Facets
    Facet 1: Bird Species
        - woodpecker
        - finch
            - chickadee
            - sparrow
    Facet 2: Coloration
        - red
        - black
        - gold
    Facet 3: Namesake Anatomy
        - head
            - crown
        - back
    Labeling
    "red-headed woodpecker" is {Bird Species: woodpecker, Coloration: red, Namesake Anatomy: head}

---

Note that in the example above, the atomic semantics in the AKRM representation may be used to explore the intersection of meanings across each KR (semantic interoperability). For example, the atomic concepts, "crown" and "head" may provide connections of meaning across formerly disjoint concepts, "sparrow" and "woodpecker".

It should be appreciated from the foregoing discussion and examples that aspects of the present invention can be directed to some of the most pressing and challenging application areas in knowledge representation, including tools for brainstorming and cognitive augmentation, supporting dynamic and emergent knowledge, and providing semantic interoperability by converting between various complex knowledge representations into a common semantic vocabulary.

Figure 11:
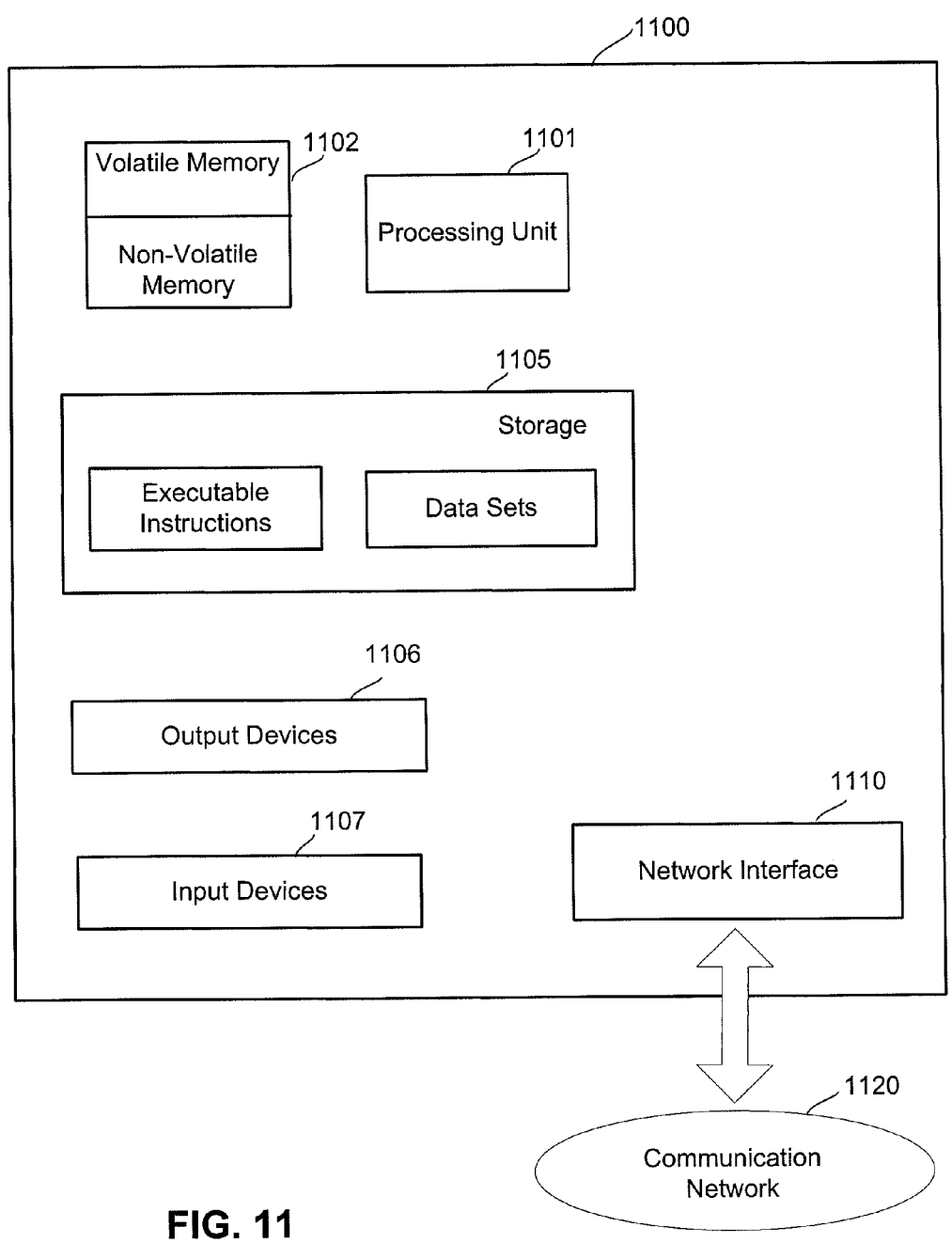
FIG. 11 is a block diagram illustrating an exemplary computing system for use in practicing some embodiments of the present invention

Various inventive aspects described herein may be used with any of one or more computers and/or devices each having one or more processors that may be programmed to take any of the actions described above for using an atomic knowledge representation model in analysis and synthesis of complex knowledge representations. For example, both server and client computing systems may be implemented as one or more computers, as described above. FIG. 11 shows, schematically, an illustrative computer 1100 on which various inventive aspects of the present disclosure may be implemented. The computer 1100 includes a processor or processing unit 1101 and a memory 1102 that may include volatile and/or non-volatile memory. The computer 1100 may also include storage 1105 (e.g., one or more disk drives) in addition to the system memory 1102.

The memory 1102 and/or storage 1105 may store one or more computer-executable instructions to program the processing unit 1101 to perform any of the functions described herein. The storage 1105 may optionally also store one or more data sets as needed. For example, a computer used to implement server system 100 may in some embodiments store AKRM data set 110 in storage 1105. Alternatively, such data sets may be implemented separately from a computer used to implement server system 100.

References herein to a computer can include any device having a programmed processor, including a rack-mounted computer, a desktop computer, a laptop computer, a tablet computer or any of numerous devices that may not generally be regarded as a computer, which include a programmed processor (e.g., a PDA, an MP3 Player, a mobile telephone, wireless headphones, etc.).

The exemplary computer 1100 may have one or more input devices and/or output devices, such as devices 1106 and 1107 illustrated in FIG. 11. These devices may be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

As shown in FIG. 11, the computer 1100 may also comprise one or more network interfaces (e.g., the network interface 1110) to enable communication via various networks (e.g., the network 1120). Examples of networks include a local area network or a wide area network, such as an enterprise network or the Internet. Such networks may be based on any suitable technology and may operate according to any suitable protocol and may include wireless networks, wired networks or fiber optic networks.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a tangible, non-transitory computer readable storage medium (or multiple computer readable storage media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer-readable storage media) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above. As used herein, the term "non-transitory computer-readable storage medium" encompasses only a computer-readable medium that can be considered to be a manufacture (i.e., article of manufacture) or a machine.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

All definitions, as defined and used herein, should be understood to control over dictionary definitions, definitions in documents incorporated by reference, and/or ordinary meanings of the defined terms.

The indefinite articles "a" and "an," as used herein, unless clearly indicated to the contrary, should be understood to mean "at least one."

As used herein, the phrase "at least one," in reference to a list of one or more elements, should be understood to mean at least one element selected from any one or more of the elements in the list of elements, but not necessarily including at least one of each and every element specifically listed within the list of elements, and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently, "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein, should be understood to mean "either or both" of the elements so conjoined, i.e., elements that are conjunctively present in some cases and disjunctively present in other cases. Multiple elements listed with "and/or" should be construed in the same fashion, i.e., as "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting.

What is claimed is:

1. A computer-implemented method for generating a complex knowledge representation, the method comprising:
    receiving input indicating a request context; and
    generating, with a processor, in accordance with the request context, a complex knowledge representation of a first type from an elemental data structure representing at least one elemental concept, at least one elemental concept relationship, or at least one elemental concept and at least one elemental concept relationship, the generating comprising:
        applying a first set of one or more rules to the elemental data structure, wherein the first set of one or more rules differs by at least one rule from a second set of one or more rules applicable to the elemental data structure to generate a complex knowledge representation of a second type different from the first type;
        based on the application of the first set of one or more rules, synthesizing, in accordance with the request context, one or more additional concepts, one or more additional concept relationships, or one or more additional concepts and one or more additional concept relationships; and
        using at least one of the additional concepts, at least one of the additional concept relationships, or at least one of the additional concepts and at least one of the additional concept relationships, generating the complex knowledge representation of the first type in accordance with the request context.

2. The method according to claim 1, wherein synthesizing includes applying at least one technique selected from the group consisting of concept analysis, faceted classification synthesis, semantic synthesis, and dynamic taxonomies.

3. The method according to claim 1, wherein receiving input includes receiving at least one item selected from the group consisting of a text query, a search term, a seed concept, and a complex KR request.

4. The method according to claim 1, wherein generating the complex knowledge representation includes at least one act selected from the group consisting of 1) generating less than a predetermined number of concepts, and 2) generating only concepts within a predetermined hierarchical distance of a seed concept.

5. The method according to claim 1, further comprising outputting the generated complex knowledge representation to a user or operator.

6. The method according to claim 1, further comprising generating the elemental data structure at least in part by deconstructing an original knowledge representation to derive the at least one elemental concept from at least one more complex concept of the original knowledge representation.

7. A computer-implemented method for deconstructing an original knowledge representation, the method comprising:
   receiving input corresponding to the original knowledge representation;
   applying, with a processor, a set of one or more rules to deconstruct the original knowledge representation into one or more elemental concepts, one or more elemental concept relationships, or one or more elemental concepts and one or more elemental concept relationships;
   including representation of at least one of the elemental concepts, at least one of the elemental concept relationships, or at least one of the elemental concepts and at least one of the elemental concept relationships in an elemental data structure; and
   generating a complex knowledge representation of a first type by applying a first set of one or more rules to the elemental data structure to transform at least a portion of the elemental data structure into the complex knowledge representation of the first type, wherein the first set of one or more rules differs by at least one rule from a second set of one or more rules applicable to the elemental data structure to generate a complex knowledge representation of a second type different from the first type.

8. The method of claim 7, further comprising synthesizing a new complex knowledge representation from the elemental data structure by applying a third set of rules to the elemental data structure.

9. The method according to claim 7, wherein generating the complex knowledge representation of the first type comprises:
   synthesizing, in accordance with a request context, one or more additional concepts, one or more additional concept relationships, or one or more additional concepts and one or more additional concept relationships; and
   using at least one of the additional concepts, at least one of the additional concept relationships, or at least one of the additional concepts and at least one of the additional concept relationships to generate the complex knowledge representation of the first type in accordance with the request context.

10. The method according to claim 7, further comprising storing the first set of one or more rules together with the second set of one or more rules.

11. The method according to claim 7, further comprising selecting the set of one or more rules based on the original knowledge representation.

12. The method according to claim 7, further comprising measuring semantic coherence of the elemental data structure.

13. The method according to claim 12, wherein measuring the semantic coherence comprises determining a term-document frequency.

14. The method according to claim 7, further comprising applying at least one technique selected from the group consisting of text analyses, statistical clustering, linguistic analyses, facet analyses, natural language processing and use of semantic knowledge-bases, to deconstruct the original knowledge representation.

15. The method according to claim 7, further comprising disambiguating the elemental concepts.

16. The method according to claim 7, wherein the elemental concepts include morphemes.

17. The method according to claim 7, wherein applying the set of one or more rules comprises deconstructing the original knowledge representation to a predetermined level of elementality.

18. A computer-implemented method for supporting semantic interoperability between knowledge representations, the method comprising:
   for each input knowledge representation of a plurality of input knowledge representations, applying, with a processor, a set of one or more rules to deconstruct the input knowledge representation into one or more elemental concepts, one or more elemental concept relationships, or one or more elemental concepts and one or more elemental concept relationships;
   with a processor, including representation of at least one of the elemental concepts, at least one of the elemental concept relationships, or at least one of the elemental concepts and at least one of the elemental concept relationships for each of the plurality of input knowledge representations in a shared elemental data structure; and
   generating a complex knowledge representation of a first type by applying a first set of one or more rules to the shared elemental data structure to transform at least a portion of the shared elemental data structure into the complex knowledge representation of the first type, wherein the first set of one or more rules differs by at least one rule from a second set of one or more rules applicable to the elemental data structure to generate a complex knowledge representation of a second type different from the first type.

* * * * *